US012143935B2

(12) United States Patent
Choi et al.

(10) Patent No.: US 12,143,935 B2
(45) Date of Patent: Nov. 12, 2024

(54) METHOD AND APPARATUS FOR TRANSMITTING AND RECEIVING POWER SAVING SIGNAL IN WIRELESS COMMUNICATION SYSTEM

(71) Applicant: Samsung Electronics Co., Ltd., Gyeonggi-do (KR)

(72) Inventors: Seunghoon Choi, Gyeonggi-do (KR); Taehyoung Kim, Gyeonggi-do (KR); Jinkyu Kang, Gyeonggi-do (KR); Youngbum Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 526 days.

(21) Appl. No.: 17/291,854

(22) PCT Filed: Dec. 17, 2019

(86) PCT No.: PCT/KR2019/017885
§ 371 (c)(1),
(2) Date: May 6, 2021

(87) PCT Pub. No.: WO2020/145537
PCT Pub. Date: Jul. 16, 2020

(65) Prior Publication Data
US 2022/0015035 A1    Jan. 13, 2022

(30) Foreign Application Priority Data
Jan. 8, 2019  (KR) .................. 10-2019-0002325

(51) Int. Cl.
*H04W 52/02* (2009.01)
*H04L 5/00* (2006.01)

(52) U.S. Cl.
CPC ....... *H04W 52/0235* (2013.01); *H04L 5/0048* (2013.01); *H04W 52/0212* (2013.01)

(58) Field of Classification Search
CPC ......... H04W 52/0235; H04W 52/0212; H04W 52/02; H04W 72/04; H04W 72/044;
(Continued)

(56) References Cited

U.S. PATENT DOCUMENTS 10,542,531 B2    1/2020  Kim et al.
2017/0338925 A1*  11/2017  Wei ................... H04W 52/0229
(Continued)

FOREIGN PATENT DOCUMENTS

KR    1020180068677    6/2018
KR    10-2018-0104062   9/2018
(Continued)

OTHER PUBLICATIONS

PCT/ISA/210 Search Report issued on PCT/KR2019/017885, Mar. 31, 2020, pp. 5.
(Continued)

*Primary Examiner* — Dinh Nguyen
(74) *Attorney, Agent, or Firm* — The Farrell Law Firm, P.C.

(57) ABSTRACT

The present disclosure relates to: a communication technique for merging IoT technology with a 5G communication system for supporting higher data transmission rates than 4G systems; and a system therefor. The present disclosure can be applied to intelligent services (e.g., smart homes, smart buildings, smart cities, smart cars or connected cars, healthcare, digital education, retail businesses, security and safety related services, etc.) on the basis of 5G communication technology and IoT-related technologies. The present disclosure discloses a method and an apparatus for transmitting a power saving signal.

15 Claims, 14 Drawing Sheets

(58) Field of Classification Search
CPC .... H04W 72/23; H04L 5/0048; H04L 5/0053; Y02D 30/70
See application file for complete search history.

(56) References Cited

U.S. PATENT DOCUMENTS

| | | | |
|---|---|---|---|
| 2018/0167920 A1* | 6/2018 | Kim | H04L 1/0038 |
| 2018/0288747 A1* | 10/2018 | Sun | H04W 72/23 |
| 2018/0302186 A1 | 10/2018 | Reddy et al. | |
| 2018/0316534 A1 | 11/2018 | Shin et al. | |
| 2018/0368116 A1 | 12/2018 | Liao et al. | |
| 2019/0110290 A1* | 4/2019 | Sun | H04W 24/08 |
| 2019/0200332 A1 | 6/2019 | Hwang et al. | |
| 2021/0076327 A1* | 3/2021 | Li | H04W 76/11 |

FOREIGN PATENT DOCUMENTS

| | | |
|---|---|---|
| KR | 10-2018-0119927 | 11/2018 |
| WO | WO2018/110993 | 6/2018 |

OTHER PUBLICATIONS

PCT/ISA/237 Written Opinion issued on PCT/KR2019/017885, Mar. 31, 2020, pp. 4.
NTT DOCOMO, Inc., "Offline summary for PDCCH structure and search space", R1-1809766, Gothenburg, Sweden, Aug. 21, 2018, pp. 66.
Nokia et al., "On the Usage of PDCCH DMRS as a Complementary Synchronization Signal in DL", R1-1714066, 3GPP TSG RAN WG1#90, Aug. 21-25, 2017, 3 pages.
Spreadtrum Communications, "Remaining issues on PDCCH Structure", R1-1801837, 3GPP TSG RAN WG1 Meeting #92, Feb. 26-Mar. 2, 2018, 7 pages.
Nokia et al., "Remaining Details of Search Space Design", R1-17118602, 3GPP TSG RAN WG1 Meeting 90bis, Oct. 9-13, 2017, 5 pages.
Korean Office Action dated Aug. 27, 2024 issued in counterpart application No. 10-2019-0002325, 9 pages.

* cited by examiner

METHOD AND APPARATUS FOR TRANSMITTING AND RECEIVING POWER SAVING SIGNAL IN WIRELESS COMMUNICATION SYSTEM

PRIORITY

This application is a National Phase Entry of PCT International Application No. PCT/KR2019/017885 which was filed on Dec. 17, 2019, and claims priority to Korean Patent Application No. 10-2019-0002325, which was filed on Jan. 8, 2019, the content of each of which is incorporated herein by reference.

TECHNICAL FIELD

The disclosure relates to a wireless communication system, and more particularly, to a method and apparatus for transmitting and receiving power saving signals in a wireless communication system.

BACKGROUND ART

In order to satisfy wireless data traffic demands that tend to increase after 4G communication system commercialization, efforts to develop an enhanced 5G communication system or a pre-5G communication system are being made. For this reason, the 5G communication system or pre-5G communication system is called a beyond 4G network communication system or a post LTE system.

In order to achieve a high data transfer rate, an implementation of the 5G communication system in a mmWave band (e.g., 60 Giga (80 GHz) band) is taken into consideration. In order to reduce a path loss of a radio wave and increase the transfer distance of a radio wave in the mmWave band, beamforming, massive MIMO, full dimensional MIMO (FD-MIMO), an array antenna, analog beamforming and large scale antenna technologies are being discussed in the 5G communication system.

Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP), and reception interference cancellation, are being developed in the 5G communication system.

In addition, hybrid FSK and QAM modulation (FQAM) and sliding window superposition coding (SWSC) that are advanced coding modulation (ACM) schemes, and filter bank multi-carrier (FBMC), non-orthogonal multiple access (NOMA) and sparse code multiple access (SCMA), that is, advanced access technologies, are being developed in the 5G system.

Meanwhile, the Internet evolves from a human-centered connection network over which human generates and consumes information to Internet of things (IoT) through which information is exchanged and processed between distributed elements, such as things. An Internet of everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched. In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, technologies, such as a sensor network, machine to machine (M2M) and machine type communication (MTC), are implemented by schemes, such as beamforming, MIMO, and an array antenna, that is, 5G communication technologies. The application of a cloud radio access network (cloud RAN) as the aforementioned big data processing technology may be said to be an example of convergence between the 5G technology and the IoT technology.

There is a need for a scheme for smoothly providing various services because these services can be provided with the development of the wireless communication system as described above.

DISCLOSURE OF INVENTION

Technical Problem

A disclosed embodiment may provide an apparatus and method capable of effectively providing services in a mobile communication system. Particularly, a disclosed embodiment may provide a scheme for improving a procedure of transmitting and receiving power saving signals in order to efficiently provide services through a wireless communication system.

Solution to Problem

A method of a terminal according to an embodiment includes receiving, from a base station, a demodulation reference signal (DMRS) received in a control resource set (CORESET), determining a region related to a location where the DMRS is received within the CORESET, and receiving control information in a search space included in the region based on a power saving-related parameter corresponding to the region.

A method of a base station according to an embodiment includes transmitting, to a terminal, a demodulation reference signal (DMRS) in a control resource set (CORESET), and transmitting, to the terminal, control information in a search space included in a region related to a location where the DMRS is transmitted in the CORESET, based on a power saving-related parameter corresponding to the region.

A terminal according to an embodiment includes a transceiver configured to transmit and receive signals and a controller configured to receive, from a base station, a demodulation reference signal (DMRS) received in a control resource set (CORESET), determine a region related to a location where the DMRS is received within the CORESET, and receive control information in a search space included in the region based on a power saving-related parameter corresponding to the region.

A base station according to an embodiment includes a transceiver configured to transmit and receive signals and a controller configured to transmit, to a terminal, a demodulation reference signal (DMRS) in a control resource set (CORESET) and to transmit, to the terminal, control information in a search space included in a region related to a location where the DMRS is transmitted in the CORESET, based on a power saving-related parameter corresponding to the region.

Advantageous Effects of Invention

According to a disclosed embodiment, services can be effectively provided in a mobile communication system. Furthermore, efficient service provision in a wireless communication system is made possible by improving a process of transmitting and receiving power saving signals.

MODE FOR THE INVENTION

Figure 1:
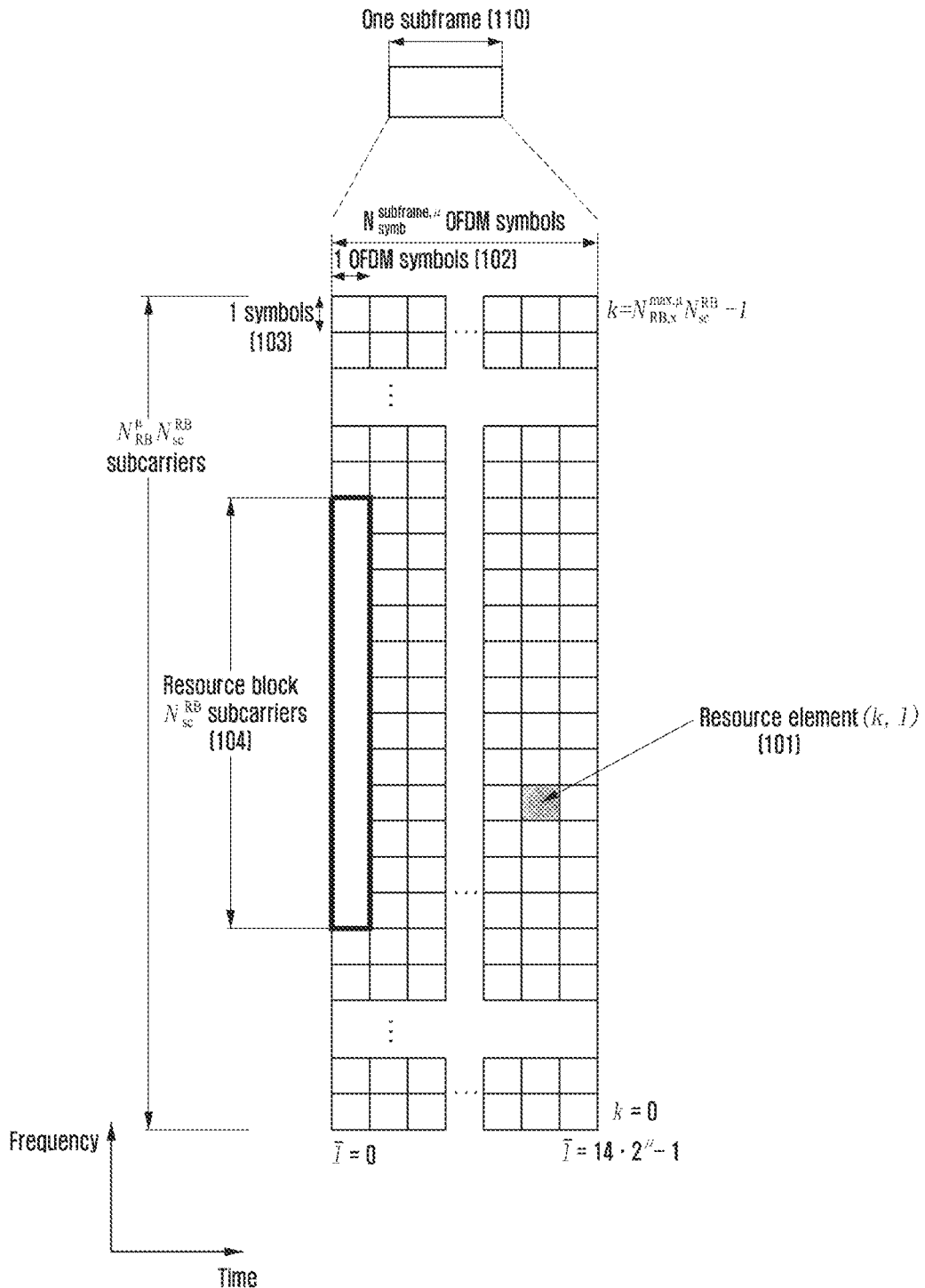
FIG. 1 is a diagram illustrating a basic structure of a time-frequency domain in a 5G communication system according to some embodiments of the disclosure.

Hereinafter, embodiments of the disclosure are described in detail with reference to the accompanying drawings.

In describing the embodiments, a description of technology contents that are well known in the art to which the disclosure pertains and that are not directly related to the disclosure is omitted in order to clearly deliver the gist of the disclosure without obscuring the gist of the disclosure by omitting an unnecessary description.

For the same reason, in the accompanying drawings, some elements are enlarged, omitted or schematically depicted. Furthermore, the size of each element does not accurately reflect its real size. In the drawings, the same or similar elements are assigned the same reference numerals.

Advantages and characteristics of the disclosure and a method for achieving the advantages and characteristics will become apparent from the embodiments described in detail in conjunction with the accompanying drawings. However, the disclosure is not limited to the disclosed embodiments, but may be implemented in various different forms. The embodiments are provided to only complete the disclosure and to fully notify a person having ordinary knowledge in the art to which the disclosure pertains of the category of the disclosure. The disclosure is defined by the category of the claims. Throughout the specification, the same reference numerals denote the same elements. Furthermore, in describing the disclosure, a detailed description of a related function or configuration is omitted if it is deemed to make the gist of the disclosure unnecessarily vague. Furthermore, terms to be described hereinafter are terms defined by taking into consideration functions in the disclosure, and may be different depending on a user, an operator's intention or practice, etc. Accordingly, each term should be defined based on contents over the entire specification.

Hereinafter, a base station is the subject of resource assignment to a terminal, and may be at least one of a gNode B (gNB), an eNode B (eNB), a Node B, a base station (BS), a radio access unit, a base station controller, a transmission and reception point (TRP) or a node on a network. A terminal may include a user equipment (UE), a mobile station (MS), a cellular phone, a smartphone, a computer, or a multimedia system capable of performing a communication function. In the disclosure, downlink (DL) is the wireless transmission path of a signal transmitted from a base station to a terminal. Uplink (UL) means the wireless transmission path of a signal transmitted from a terminal to a base station. Furthermore, hereinafter, an LTE or LTE-A system may be described as an example, but an embodiment of the disclosure may also be applied to other communication systems having a similar technical background or channel form. For example, a 5 generation mobile communication technology (5G or new radio (NR)) developed after LTE-A may be included in the other communication systems. 5G hereinafter may be a concept including the existing LTE, LTE-A and other similar services. Furthermore, the disclosure may also be applied to other communication systems through some modifications without greatly departing from the scope of the disclosure based on a determination of a person having skilled technical knowledge.

In this case, it will be understood that each of the blocks of the flowchart drawings and combinations of the blocks of the flowchart drawings can be executed by computer program instructions. These computer program instructions may be mounted on the processor of a general purpose computer, a special purpose computer or other programmable data processing apparatus, so that the instructions executed by the processor of the computer or other programmable data processing apparatus create means for executing the functions specified in the flowchart block(s). These computer program instructions may also be stored in a computer-usable or computer-readable memory that can direct a computer or other programmable data processing equipment to implement a function in a particular manner, such that the instructions stored in the computer-usable or computer-readable memory produce an article of manufacture including instruction means that implement the function specified in the flowchart block(s). The computer program instructions may also be loaded on a computer or other programmable data processing apparatus to cause a series of operational steps to be performed on the computer or other programmable data processing apparatus to produce a computer-executed process, so that the instructions performing the computer or other programmable data processing apparatus may provide steps for executing the functions described in the flowchart block(s).

Furthermore, each block of the flowchart drawings may represent a portion of a module, a segment or code, which includes one or more executable instructions for implementing a specified logical function(s). It should also be noted that in some alternative implementations, the functions noted in the blocks may be performed out of order. For example, two blocks shown in succession may in fact be executed substantially concurrently or the blocks may sometimes be executed in the reverse order, depending upon the functionality involved.

In this case, the term "unit", as used in the present embodiment means software or a hardware component, such as a field programmable gate array (FPGA) or an application-specific integrated circuit (ASIC), and the "unit" performs specific tasks. However, the meaning of "~unit" is not limited to software or hardware. The "unit" may be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more CPUs within a device or a security multimedia card. Furthermore, in an embodiment. "~unit" may include one or more processor.

A wireless communication system is developed into a wideband wireless communication system which provides high-speed and high-quality packet data services as in communication standards, such as high speed packet access (HSPA) of 3GPP, long term evolution (LTE) or evolved universal terrestrial radio access (E-UTRA)), LTE-advanced (LTE-A), LTE-Pro, high rate packet data (HRPD) of 3GPP2, ultra mobile broadband (UMB), and 802.16e of IEEE, instead of the provision of initial voice-focused service.

As a representative example of the wideband wireless communication system, an LTE system adopts an orthogonal frequency division multiplexing (OFDM) method in downlink (DL) and adopts a single carrier frequency division multiple access (SC-FDMA) method in uplink (UL). UL means a radio link through which a terminal (user equipment (UE) or mobile station (MS)) transmits data or a control signal to a base station. DL means a radio link through which a base station transmits data or a control signal to a terminal. In general, in such a multi-access method, data or control information of each user may be identified by assigning and operating time-frequency resources on which data or control information will be carried and transmitted for each user so that the time-frequency resources do not overlap, that is, orthogonality is established.

A future communication system after LTE, that is, a 5G communication system, needs to support services that simultaneously satisfy various requirements because the system needs to freely incorporate various requirements, such as a user and a service provider. Services being considered for the 5G communication system include enhanced mobile broadband (eMBB), massive machine type communication (mMTC), ultra reliability low latency communication (URLLC), etc.

eMBB aims at providing a data transmission rate higher than a data transmission rate supported by the existing LTE, LTE-A or LTE-Pro. For example, in a 5G communication system, eMBB needs to be capable of providing a peak data rate of 20 Gbps in DL and a peak data rate of 10 Gbps in UL from the viewpoint of one base station. Furthermore, a 5G communication system needs to provide the peak data rate and also provide a user perceived data rate of increased terminal. In order to satisfy such requirements, various transmission and reception technologies, including a further enhanced multi input multi output (MIMO) transmission technology, need to be improved. Furthermore, in a 2 GHz band used by LTE, a signal is transmitted using a maximum 20 MHz transmission bandwidth. In contrast, a 5G communication system may satisfy a data transmission rate necessary for the 5G communication system by using a frequency bandwidth wider than 20 MHz in a frequency band of 3 to 6 GHz or 6 GHz or more.

At the same time, in order to support application services such as Internet of thing (IoT), mMTC is considered in the 5G communication system. mMTC requires the support of access by many terminals within a cell, enhanced coverage of a terminal, an increased battery time, a reduction in the cost of a terminal, etc. in order to efficiently provide the IoT. The IoT needs to support many terminals (e.g., 1,000,000 terminals/km$^2$) within a cell because the IoT is attached to several sensors and various devices and provides a communication function. Furthermore, there is a good possibility that a terminal supporting mMTC will be located in a shadow area not covered by a cell, such as the underground of a building, due to the nature of service. Accordingly, mMTC may require wider coverage compared to other services provided by the 5G communication system. A terminal supporting mMTC needs to consist of cheap terminals, and may require a very long battery life time, such as 10 to 15 years, because it is difficult to frequently change the battery of the terminal.

Finally, URLLC is a cellular-based radio communication service used for a mission-critical purpose. For example, services used for remote control for robots or machinery, industrial automation, an unmanned aerial vehicle, remote health care, emergency alert, etc. may be considered. Accordingly, communication provided by URLLC needs to provide very low latency and very high reliability. For example, services supporting URLLC need to satisfy air interface latency time smaller than 0.5 millisecond and have requirements for a packet error rate of 10^-5 or less. Accordingly, for services supporting URLLC, a 5G system needs to provide a transmit time interval (TTI) smaller than that of other services, and may also require design matters for assigning wide resources in a frequency band in order to secure the reliability of a communication link.

The three services of 5G, that is, eMBB, URLLC, and mMTC, may be multiplexed and transmitted in one system. In this case, in order to satisfy different requirements for the services, different transmission and reception schemes and transmission and reception parameters may be used between the services. Of course, 5G is not limited to the aforementioned three services.

Hereinafter, a frame architecture of a 5G system is more specifically described with reference to drawings.

FIG. 1 is a diagram illustrating basic structure of a time-frequency domain, that is, a radio resource region in which data or a control channel is transmitted, in a 5G system according to some embodiments of the disclosure.

In FIG. 1, a transverse axis indicates a time domain, and a longitudinal axis indicates a frequency domain. In the time and frequency domains, a basic unit of a resource is a resource element (RE) 101, and may be defined as one orthogonal frequency division multiplexing (OFDM) symbol 102 in the time axis and one subcarrier 103 in the frequency axis. In the frequency domain, $N_{sc}^{RB}$ (e.g., 12) contiguous REs may constitute one resource block (RB) 104. One subframe 110 is defined as a time interval of 1 ms in the time domain. Multiple (e.g., 14) OFDM symbols may form a slot as a transmission time interval (TTI).

Figure 2:
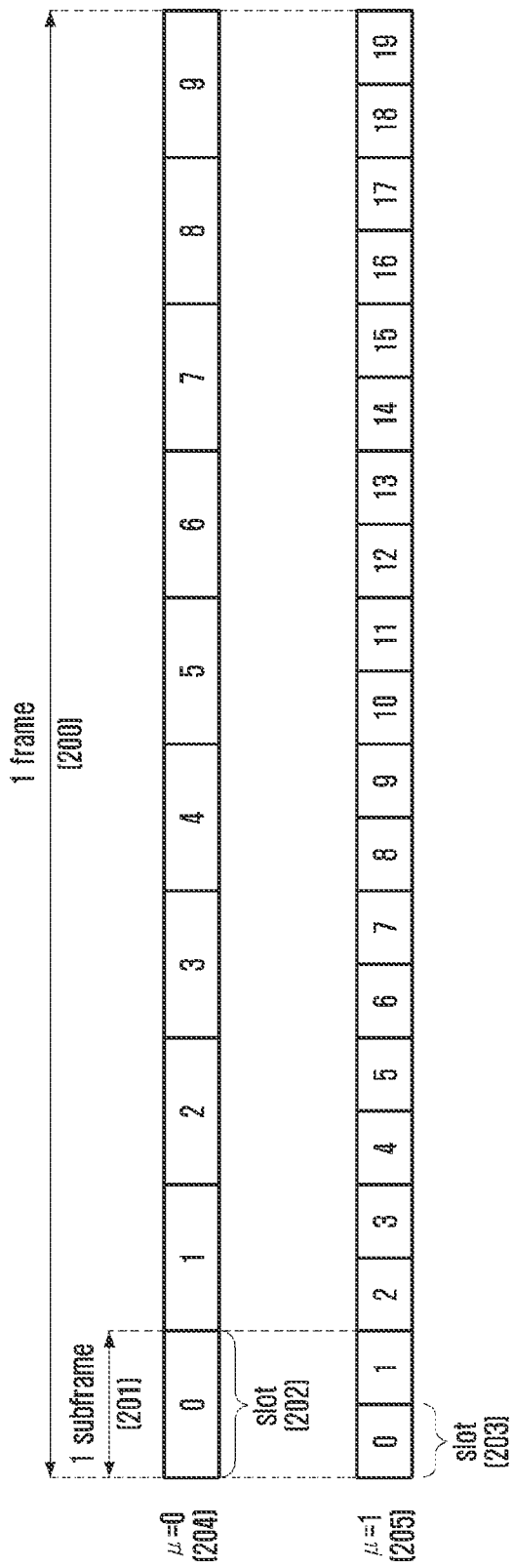
FIG. 2 is a diagram illustrating the structure of a frame, subframes, and slots in a 5G communication system according to some embodiments of the disclosure.

FIG. 2 is a diagram illustrating a slot structure considered in a 5G system according to some embodiments of the disclosure.

FIG. 2 illustrates an example of the structure of a frame 200, subframes 201, and slots 202. One frame 200 may be defined 10 ms. One subframe 201 may be defined 1 ms. Accordingly, the one frame 200 may consist of a total of 10 subframes 201. One slot 202 or 203 may be defined as 14 OFDM symbols (i.e., the number of symbols per slot ($N_{symb}^{slot}$)=14). The one subframe 201 may consist of one or a plurality of slots 202, 203. The number of slots 202, 203 per subframe 201 may be different depending on a setting value μ 204, 205 for subcarrier spacing. The example of FIG. 2 illustrates a case where a subcarrier spacing setting value μ=0 204 and a subcarrier spacing setting value μ=1 205. In the case of μ=0 204, the one subframe 201 may consist of one slot 202. In the case of μ=1 205, the one subframe 201 may consist of two slots 203. That is, the number of slots per subframe ($N_{slot}^{subframe, \mu}$) may be different depending on the setting value μ for subcarrier spacing. Accordingly, the number of slots per frame ($N_{slot}^{frame, \mu}$) may be different. $N_{slot}^{subframe, \mu}$ and $N_{slot}^{frame, \mu}$ according to each subcarrier spacing configuration p may be defined as Table 1 below.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

A bandwidth part (BWP) configuration in a 5G communication system is more specifically described with reference to drawings.

Figure 3:
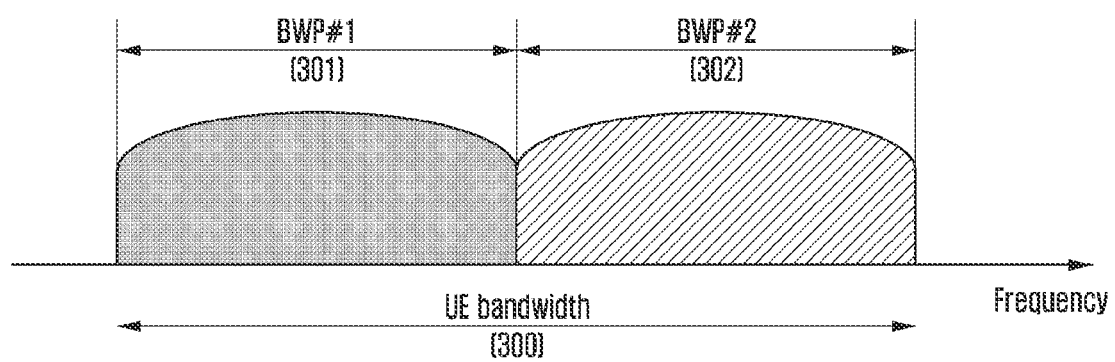
FIG. 3 is a diagram illustrating an example of a bandwidth part configuration in a 5G communication system according to some embodiments of the disclosure.

FIG. 3 is a diagram illustrating an example of a configuration for a bandwidth part in a 5G communication system according to some embodiments of the disclosure.

FIG. 3 illustrates an example in which a UE bandwidth 300 consists of two bandwidth parts, that is, a bandwidth part#1 (BWP#1) 301 and a bandwidth part#2 (BWP#2) 302. A base station may configure one or a plurality of bandwidth parts for a terminal, and may configure pieces of information of Table 2 for each bandwidth part.

TABLE 2

| BWP ::= | SEQUENCE { |
|---|---|
| bwp-Id (bandwidth part ID) | BWP-Id, |
| locationAndBandwidth (bandwidth part location) | INTEGER (1..65536), |
| subcarrierSpacing (subcarrier spacing) | ENUMERATED {n0, n1, n2, n3, n4, n5} |
| cyclicPrefix (cyclic prefix) | ENUMERATED {extended} |
| } | |

Of course, the disclosure is not limited to the example. In addition to the configuration information, various parameters related to the bandwidth part may be configured for a terminal. A base station may transmit the pieces of information to a terminal through higher layer signaling, for example, radio resource control (RRC) signaling. One configured bandwidth part or at least one of a plurality of configured bandwidth parts may be activated. Whether to activate the configured bandwidth part may be semi-statically transmitted through RRC signaling or dynamically transmitted through downlink control information (DCI) from the base station to the terminal.

According to some embodiments, a terminal prior to an RRC connection may have an initial BWP for initial access configured by a base station through a master information block (MIB). This is described more specifically. In an initial access step, the terminal may receive configuration information for a control region (control resource set (CORESET)) in which a physical downlink control channel (PDCCH) for receiving system information (may correspond to remaining system information (RMSI) or system information block 1 (SIB1)) necessary for initial access may be transmitted and a search space through the MIB. Each of the control region and the search space configured through the MIB may be considered to have each identity (ID) of 0. The base station may notify the terminal of the configuration information, such as frequency assignment information, time assignment information, and a numerology, for a control region#0 through the MIB. Furthermore, the base station may notify the terminal of the configuration information for a monitoring period and occasion of the control region#0, that is, the configuration information for a search space#0, through the MIB. The terminal may consider a frequency domain, configured as the control region#0 obtained from the MIB, to be an initial BWP for initial access. In this case, the ID of the initial BWP may be considered to be 0.

A configuration of a bandwidth part supported in the 5G may be used for various purposes.

According to some embodiments, if a bandwidth supported by a terminal is smaller than a system bandwidth, this may be supported through the bandwidth part configuration. For example, a base station may configure a frequency location (configuration information 2) of a bandwidth part for a terminal, so the terminal can transmit and receive data in a specific frequency location within a system bandwidth.

Furthermore, according to some embodiments, a base station may configure a plurality of bandwidth parts for a terminal for the purpose of supporting different numerologies. For example, in order to support both data transmission and reception using subcarrier spacing of 15 kHz and subcarrier spacing of 30 kHz for a terminal, two bandwidth parts may be configured as the subcarrier spacings of 15 kHz and 30 kHz, respectively. Different bandwidth parts may be subjected to frequency division multiplexing (FDM). If data is to be transmitted and received through a specific subcarrier spacing, a bandwidth part configured as the corresponding subcarrier spacing may be activated.

Furthermore, according to some embodiments, a base station may configure a bandwidth part, having a bandwidth of a different size, for a terminal for the purpose of reducing power consumption of the terminal. For example, if a terminal supports a very large bandwidth, for example, a bandwidth of 100 MHz and always transmits and receives data in the corresponding bandwidth, very great power consumption may occur. Particularly, to perform unnecessary monitoring for a downlink control channel in the large bandwidth of 100 MHz in a situation in which traffic is not present may be very inefficient from the viewpoint of power consumption. For the purpose of reducing power consumption of the terminal, a base station may configure a bandwidth part having a relatively small bandwidth, for example, a bandwidth part of 20 MHz for the terminal. In a situation in which traffic is not present, the terminal may perform a monitoring operation in the 20 MHz bandwidth part. If data has been generated, the terminal may transmit and receive the data in the bandwidth part of 100 MHz under the instruction of the base station.

In a method of configuring a bandwidth part, terminals prior to RRC connected may receive configuration information for an initial BWP through an MIB in an initial access step. This is described more specifically. A terminal may have a control region (CORESET) for a downlink control channel in which DCI for scheduling a system information block (SIB) may be transmitted configured from an MIB of a physical broadcast channel (PBCH). A bandwidth of the control region configured as the MIB may be considered to be an initial BWP. The terminal may receive, through the configured initial BWP, a physical downlink shared channel (PDSCH) in which an SIB is transmitted. The initial BWP may also be used for other system information (OSI), paging, and random access in addition to the use for receiving the SIB.

A synchronization signal (SS)/PBCH block in 5G is described.

The SS/PBCH block may mean a physical layer channel block consisting of a primary SS (PSS), a secondary SS (SSS), and a PBCH. This is specifically described below.
- PSS: provides some information of a cell ID as a signal that is a reference for downlink time/frequency synchronization.
- SSS: becomes a reference for downlink time/frequency synchronization and provides the remaining cell ID information not provided by a PSS. Additionally, the SSS may play a role as a reference signal for the demodulation of a PBCH.
- PBCH: provides essential system information necessary for data channel and control channel transmission and reception by a terminal. The essential system information may include control information related to a search space indicative of radio resource mapping information of a control channel, scheduling control information for a separate data channel in which system information is transmitted, etc.
- SS/PBCH block: the SS/PBCH block consists of a combination of a PSS, an SSS, and a PBCH. One or a plurality of SS/PBCH blocks may be transmitted within a 5 ms time. Transmitted SS/PBCH blocks may be classified based on indices.

A terminal may detect a PSS and an SSS in an initial access step, and may decode a PBCH. The terminal may obtain an MIB from the PBCH, and may have a control region#0 configured from the MIB. The terminal may perform monitoring on the control region#0, assuming that the selected SS/PBCH block and a demodulation reference signal (DMRS) transmitted in the control region#0 are quasi-colocation (QCL)ed. The terminal may receive system information as downlink control information transmitted in the control region#0. The terminal may obtain, from the received system information, random access channel (RACH)-related configuration information necessary for initial access. The terminal may transmit a physical RACH (PRACH) to a base station by considering the selected SS/PBCH index. The base station that has received the PRACH may obtain information on the index of the SS/PBCH block selected by the terminal. The base station may be aware that the terminal has selected a specific one of SS/PBCH blocks and monitors the control region#0 associated with the selected block.

Downlink control information (DCI) in a 5G system is specifically described.

In a 5G system, scheduling information for uplink data (or a physical uplink shared channel (PUSCH)) or downlink data (or a physical downlink shared channel (PDSCH) is transmitted from a base station to a terminal through DCI. The terminal may monitor a DCI format for fallback and a DCI format for non-fallback with respect to the PUSCH or the PDSCH. The DCI format for fallback may consist of a fixed field previously defined between the base station and the terminal. The DCI format for non-fallback may include a configurable field.

DCI may be transmitted through a PDCCH, that is, a physical downlink control channel, according to a channel coding and modulation process. Cyclic redundancy check (CRC) is attached to DCI message payload. The CRC may be scrambled by a radio network temporary identifier (RNTI) corresponding to the identity of a terminal. Different RNTIs may be used for the purpose of a DCI message, for example, UE-specific data transmission, a power control command or a random access response. That is, the RNTI is not explicitly transmitted, and is included in a CRC calculation process and transmitted. When receiving a DCI message transmitted on a PDCCH, the terminal may check CRC by using an RNTI assigned thereto. If a result of the check of the CRC is correct, the terminal may be aware that the corresponding message has been transmitted to the terminal.

For example, DCI that schedules a PDSCH for system information (SI) may be scrambled by an SI-RNTI. DCI that schedules a PDSCH for a random access response (RAR) message may be scrambled by an RA-RNTI. DCI that schedules a PDSCH for a paging message may be scrambled by a P-RNTI. DCI that provides notification of a slot format indicator (SFI) may be scrambled by an SFI-RNTI. DCI that provides notification of transmit power control (TPC) may be scrambled by a TPC-RNTI. DCI that schedules a UE-specific PDSCH or PUSCH may be scrambled by a cell RNTI (C-RNTI).

A DCI format 0_0 may be used as DCI for fallback that schedules a PUSCH. In this case, CRC may be scrambled by a C-RNTI. The DCI format 0_0 with the CRC scrambled by the C-RNTI may include pieces of information of Table 3 below, for example

TABLE 3

Identifier for DCI formats (DCI format identifier) - [1] bit
Frequency domain resource assignment (frequency domain resource assignment)
$[\lceil \log_2(N_{RB}^{UL, BWP}(N_{RB}^{UL, BWP} + 1)/2)\rceil]$ bits
Time domain resource assignment (time domain resource assignment) - X bits
Frequency hopping flag (frequency hopping flag) - 1 bit
Modulation and coding scheme (modulation and coding scheme) - 5 bits
New data indicator (new data indicator) - 1 bit
Redundancy version (redundancy version) - 2 bits
HARQ process number (HARQ process number) - 4 bits
TPC command for scheduled PUSCH (transmit power control command for scheduled PUSCH) - [2] bits
UL/SUL indicator (uplink/supplementary UL) indicator) - 0 or 1 bit A DCI format 0_1 may be used as DCI for non-fallback that schedules a PUSCH. In this case, CRC may be scrambled by a C-RNTI. The DCI format 0_1 with the CRC scrambled by the C-RNTI may include pieces of information of Table 4 below, for example.

TABLE 4

Carrier indicator (carrier indicator) - 0 or 3 bits
UL/SUL indicator - 0 or 1 bit
Identifier for DCI formats - [1] bits
Bandwidth part indicator (bandwidth part indicator) - 0, 1 or 2 bits
Frequency domain resource assignment
For resource allocation type 0 (when a resource allocation type is 0), $\lceil N_{RB}^{UL, BWP}/P \rceil$ bits
For resource allocation type 1 (when a resource allocation type is 1),
$[\lceil \log_2(N_{RB}^{UL, BWP}(N_{RB}^{UL, BWP} + 1)/2)\rceil]$ bits
Time domain resource assignment - 1, 2, 3, or 4 bits
VRB-to-PRB mapping (virtual resource block-to physical resource block mapping) - 0 or 1 bit, only for resource allocation type 1.
0 bit if only resource allocation type 0 is configured:
1 bit otherwise,
Frequency hopping flag - 0 or 1 bit, only for resource allocation type 1.
0 bit if only resource allocation type 0 is configured:
1 bit otherwise,
Modulation and coding scheme - 5 bits
New data indicator - 1 bit
Redundancy version - 2 bits
HARQ process number - 4 bits
$1^{st}$ downlink assignment index (first downlink assignment index) - 1 or 2 bits
1 bit for semi-static HARQ-ACK codebook (in the case of a semi-static HARQ-ACK codebook)
2 bits for dynamic HARQ-ACK codebook with single HARQ-ACK codebook
(when a dynamic HARQ-ACK codebook is used along with a single HARQ-ACK codebook)
$2^{nd}$ downlink assignment index (second downlink assignment index) - 0 or 2 bits
2 bits for dynamic HARQ-ACK codebook with two HARQ-ACK sub-codebooks
(when a dynamic HARQ-ACK codebook is used along with two HARQ-ACK sub-codebooks)
0 bit otherwise
TPC command for scheduled PUSCH - 2 bits
SRS resource indicator (SRS resource indicator) - $\lceil \log_2(\Sigma_{k=1}^{Lmax}(N_k^{SRS}))\rceil$ or $\lceil \log_2(N_{SRS})\rceil$ bits
$\lceil \log_2(\Sigma_{k=1}^{Lmax}(N_k^{SRS}))\rceil$ bits for non-codebook based PUSCH transmission (if PUSCH transmission is not based on a codebook)
$\lceil \log_2(N_{SRS})\rceil$ bits for codebook based on PUSCH transmission (if PUSCH transmission is based on a codebook)
Precoding information and number of layers (precoding information and the number of layers) - up to 6 bits
Antenna ports (antenna ports) - up to 5 bits
SRS request (SRS request) - 2 bits
CSI request (channel state information request) - 0, 1, 2, 3, 4, 5 or 6 bits
CBG transmission information (code book group transmission information - 0, 2, 4, 6 or 8 bits
PTRS-D-DMRS association (phase tracking reference signal-demodulation reference signal relation) - 0 or 2 bits
beta_offset indicator (beta offset indicator) - 0 or 2 bits
DMRS sequence initialization (demodulation reference signal sequence initialization) - 0 or 1 bit A DCI format 10 may be used as DCI for fallback that schedules a PDSCH. In this case, CRC may be scrambled by a C-RNTI. The DCI format 1_0 with the CRC scrambled by the C-RNTI may include pieces of inform of Table 5 below, for example.

TABLE 5

Identifier for DCI formats - [1] bit
Frequency domain resource assignment - $\lceil \log_2(N_{RB}^{DL, BWP}(N_{RB}^{DL, BWP} + 1)/2) \rceil$ bits
Time domain resource assignment - X bitgs
VRB-to-PRB mapping - 1 bit
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator (physical uplink control channel, PUCCH) resource indicator - 3 bits
PDSCH-to-HARQ feedback timing indicator (PDSCH-to-HARQ feedback timing indicator) - [3] bits A DCI format 1_1 may be used as DCI for non-fallback that schedules a PDSCH. In this case, CRC may be scrambled by a C-RNTI. The DCI format 1_1 with the CRC scrambled by the C-RNTI may include pieces of information of Table 6 below, for example.

TABLE 6

Carrier indicator (carrier indicator) - 0 or 3 bits
Identifier for DCI formats - [1] bits
Bandwidth part indicator - 0, 1 or 2 bits
Frequency domain resource assignment
For resource allocation type 0, $\lceil N_{RB}^{DL, BWP}/P \rceil$ bits
For resource allocation type 1, $\lceil \lceil \log_2(N_{RB}^{DL, BWP}(N_{RB}^{DL, BWP} + 1)/2 \rceil \rceil$ bits
Time domain resource assignment - 1, 2, 3, or 4 bits
VRB-to-PRB mapping - 0 or 1 bit, only for resource allocation type 1.
0 bit if only resource allocation type 0 is configured:
1 bit otherwise,
PRB bundling size indicator (physical resource block bundling size indicator) - 0 or 1 bit
Rate matching indicator (rate matching indicator) - 0, 1 or 2 bits
ZP CSI-RS trigger (zero-power channel state information-reference signal trigger) 0, 1 or 2 bits
For transport block 1 (in the case of a first transport block)
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ feedback timing indicator - 3 bits
Antenna ports - 4, 5 or 6 bits
Transmission configuration indication (transmission configuration indication) - 0 or 3 bits
SRS request - 2 bits
CBG transmission information - 0, 2, 4, 6, or 8 bits
CBG flushing out information (code block group flushing out information) - 0 or 1 bit
DMRS sequence initialization - 1 bit Hereinafter, a downlink control channel in a 5G communication system is to be more specifically described with reference to drawings.

Figure 4:
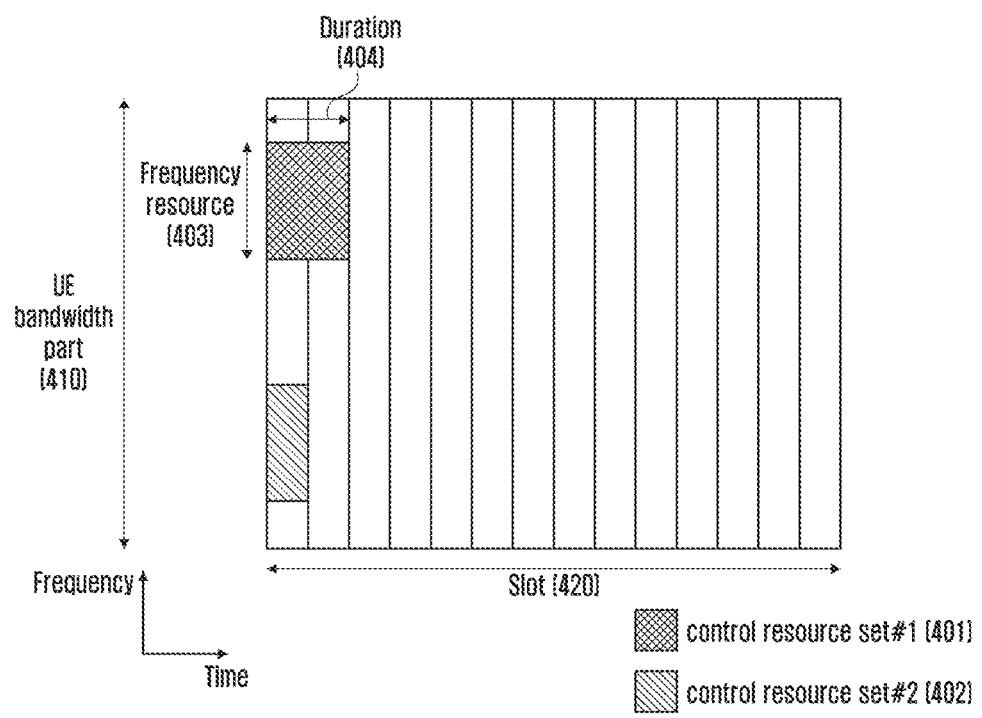
FIG. 4 is a diagram illustrating an example of the configuration of a control region of a downlink control channel in a 5G communication system according to some embodiments of the disclosure.

FIG. 4 is a diagram illustrating an example of a control region CORESET in which a downlink control channel is transmitted in a 5G wireless communication system according to some embodiments of the disclosure. FIG. 4 illustrates an example in which a UE bandwidth part 410 is configured in a frequency axis and two control regions (control region#1 401 and control region#2 402) are configured within one slot 420 in a time axis. The control regions 401 and 402 may be configured in a specific frequency resource 403 within the entire UE bandwidth part 410 in the frequency axis. In the time axis, one or a plurality of OFDM symbols may be configured, which may be defined as a control region length (control resource set duration 404). Referring to the example illustrated in FIG. 4, the control region#1 401 is configured with a control region length having 2 symbols, and the control region#2 402 is configured with a control region length having 1 symbol.

A base station may configure the control region in the 5G for a terminal through higher layer signaling (e.g., system information, an MIB or RRC signaling). To configure the control region for the terminal means that information, such as a control region identity, a frequency location of the control region, a symbol length of the control region, etc. are provided. For example, the information may include pieces of information of Table 7 below.

TABLE 7

```
ControlResourceSet ::=              SEQUENCE{
-- Corresponds to L1 parameter      'CORESET-ID'
    controlResourceSetId            ControlResourceSetId,
    (control region identity)
    frequencyDomainResources        BIT STRING (SIZE (45)),
    (frequency axis resource assignment information)
    Duration                        INTEGER (1..maxCoReSetDuration),
    (time axis resource assignment information)
    cce-REG-MappingType             CHOICE {
    (CCE-to-REG snapping method)
        Interleaved                 SEQUENCE {
            Reg-BundleSize              ENUMERATED {n2, n3, n6},
            (REG bundle size)
            precoderGranularity         ENUMERATED {sameAsREG-bundle, allContinuousRBs},
            interleaverSize             ENUMERATED {n2, n3, n6},
            (interleaver size)
            shiftindex                  INTEGER(0..maxNrofPhysicalResourceBlocks-1)
                            OPTIONAL
            (interleaver shift)
        },
        nonInterleaved              NULL
    },
    tci-StatesPDCCH                 SEQUENCE(SIZE (1..maxNrofTCI-StatesPDCCH)) OF TCI-StateId
                                    OPTIONAL
    (QCL configuration information)
        tci-PresentInDCI            ENUMERATED (enabled)
                                    OPTIONAL, -- Need S
}
```

In Table 7, the tci-States PDCCH (simply named a TCI state) configuration information may include information on the index of one or a plurality of SS/PBCH blocks or the index of a channel state information reference signal (CSI-RS) having a QCL relation with a DMRS transmitted in a corresponding control region.

Figure 5:
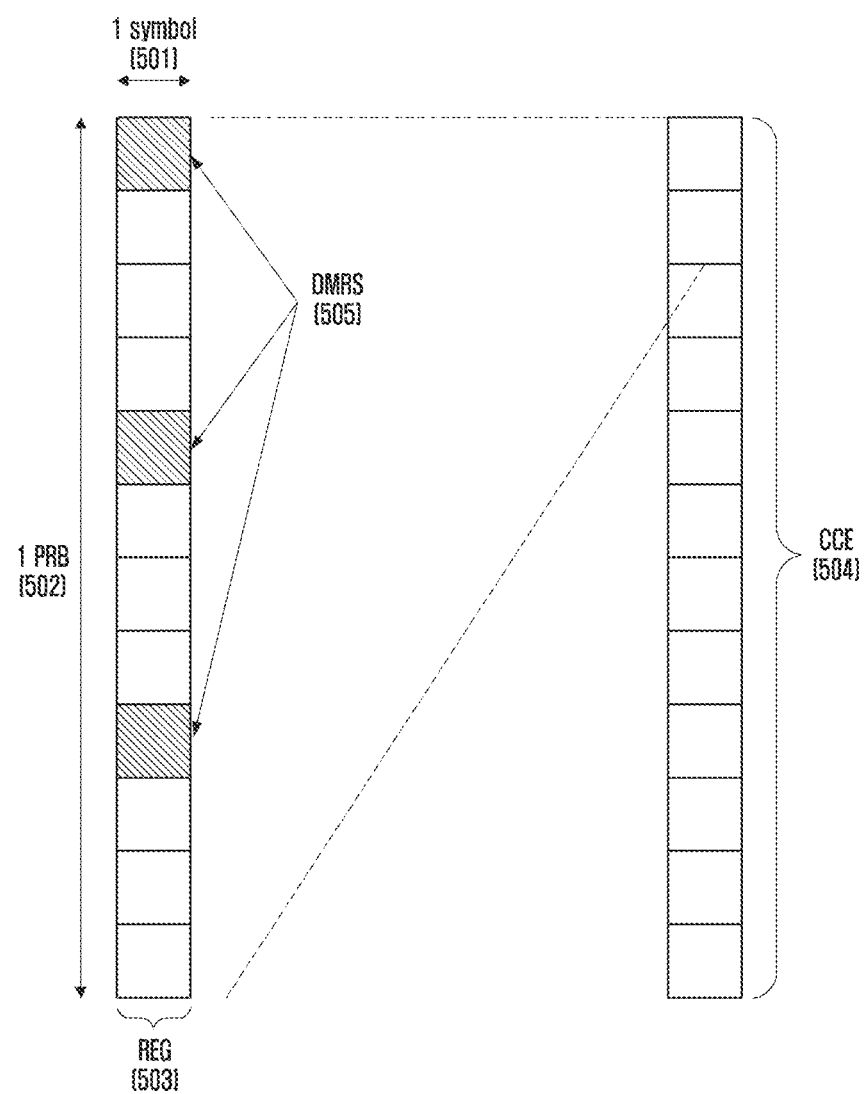
FIG. 5 is a diagram illustrating the structure of a downlink control channel in a 5G communication system according to some embodiments of the disclosure.

FIG. 5 is a diagram illustrating an example of a basic unit of time and frequency resource configuring a downlink control channel which may be used in 5G according to some embodiments of the disclosure. According to FIG. 5, the basic unit of the time and frequency resource configuring the control channel may be called a resource element group (REG) 503. The REG 503 may be defined as one OFDM symbol 501 in a time axis and one physical resource block (PRB) 502, that is, 12 subcarriers in a frequency axis. A base station may configure a downlink control channel assignment unit connected to the REG 503.

As illustrated in FIG. 5, if the basic unit to which a downlink control channel is assigned in 5G is said to be a control channel element (CCE) 504, one CCE 504 may consist of a plurality of REGs 503. The REG 503 illustrated in FIG. 5 is described as an example. If the REG 503 consists of 12 REs and one CCE 504 consists of six REGs 503, one CCE 504 may consist of 72 REs. If a downlink control region is configured, the corresponding region may consist of a plurality of CCEs 504. A specific downlink control channel may be mapped and transmitted in one or a plurality of CCEs 504 based on an aggregation level (AL) within the control region. The CCEs 504 within the control region are classified based on numbers. In this case, the numbers of the CCEs 504 may be assigned according to a logical mapping method.

The basic unit of the downlink control channel illustrated in FIG. 5, that is, the REG 503, may include all of REs to which DCI is mapped and an RE to which a DMRS 505, that is, a reference signal for decoding DCI, is mapped. As in FIG. 5, three DMRSs 505 may be transmitted within the one REG 503. The number of CCEs necessary to transmit a PDCCH may be 1, 2, 4, 8, or 16 depending on an aggregation level (AL). The different number of CCEs may be used to implement the link adaptation of a downlink control channel. For example, when AL=L, one downlink control channel may be transmitted through L CCEs. A terminal needs to detect a signal in the state in which the terminal is unaware of information on a downlink control channel. For blind decoding, a search space indicative of a set of CCEs was defined. The search space is a set of downlink control channel candidates composed of CCEs on which the terminal has to perform decoding on a predetermined AL. The terminal may have a plurality of search spaces because there are several ALs forming one bundle using 1, 2, 4, 8 or 16 CCEs. A search space set may be defined as a set of search spaces in all configured ALs.

The search space may be divided into a common search space and a UE-specific search space. A group of terminals or all terminals may examine a common search space of a PDCCH in order to receive dynamic scheduling for system information or cell-common control information, such as a paging message. For example, PDSCH scheduling assignment information for the transmission of an SIB, including service provider information of a cell, may be received by examining a common search space of a PDCCH. The common search space may be defined as a set of pre-agreed CCEs because a group of terminals or all terminals have to receive a PDCCH. Scheduling assignment information for a UE-specific PDSCH or PUSCH may be received by examining a UE-specific search space of a PDCCH. The UE-specific search space may be defined as the identity of a terminal and a function of various system parameters in a UE-specific manner.

In 5G, a parameter for a search space for a PDCCH may be configured from a base station to a terminal through higher layer signaling (e.g., an SIB, an MIB or RRC signaling). For example, the base station may configure, for the terminal, the number of PDCCH candidate groups in each AL L, a monitoring period for a search space, a monitoring occasion of a symbol unit within a slot for a search space, a search space type (common search space or UE-specific search space), a combination of a DCI format to be monitored in a corresponding search space and an RNTI, the index of a control region in which a search space is to be monitored, etc. For example, the parameter may include 5 pieces of information of Table 8 below.

DCI format 2_0 with CRC scrambled by SFI-RNTI

DCI format 2_1 with CRC scrambled by INT-RNTI

DCI format 2_2 with CRC scrambled by TPC-PUSCH-RNTI, TPC-PUCCH-RNTI

DCI format 2_3 with CRC scrambled by TPC-SRS-RNTI

TABLE 8

```
SearchSpace::=                         SEQUENCE {
    ---Identity of the search space. SearchSpaceId = 0 identifies the SearchSpace configured via PBCH(MIB) or
ServingCellConfigCommon.
       searchSpaceId                   SearchSpaceId,
       (search space identity)
       controlResourceSetId            ControlResourceSetId,
       (control region identity)
       monitoringSlotPeriodicityAndOffset  CHOICE {
       (monitoring slot level period)
          sl1                          NULL,
          sl2                          INTEGER (0..1),
          sl4                          INTEGER (0..3),
          sl5                          INTEGER (0..4),
          sl8                          INTEGER (0..7),
          sl10                         INTEGER (0..7),
          sl16                         INTEGER (0..15),
          sl20                         INTEGER (0..19),
       }
                OPTIONAL
       duration (monitoring length)    INTEGER (2..2559)
          monitoringSymbolWithinSlot        BIT STRING SIZE (SIZE (14))
                OPTIONAL
       (monitoring symbol within slot)
       nrofCandidates                  SEQUENCE {
       (Number of PDCCH candidate groups for AL)
          aggregationLevel1            ENUMERATED {n0, n1, n2, n3, n4, n5, n6, n8},
          aggregationLevel2            ENUMERATED {n0, n1, n2, n3, n4, n5, n6, n8},
          aggregationLevel4            ENUMERATED {n0, n1, n2, n3, n4, n5, n6, n8},
          aggregationLevel8            ENUMERATED {n0, n1, n2, n3, n4, n5, n6, n8},
          aggregationLevel16           ENUMERATED {n0, n1, n2, n3, n4, n5, n6, n8}
       },
       searchSpaceType                 CHOICE {
       (search space type)
          --Configures this search space as common search space (CSS) and DCI formats to monitor,
          common                       SEQUENCE {
       (common search space)
          }
          ue-Specific                  SEQUENCE {
       (UE-specific search space)
             -- Indicates whether the UE monitors in this USS for DCI formats to 0-0 and 1-0 or for formats 0-1 and
1-1,
             formats                   ENUMERATED {formats0-0-And-1-0, formats0-1-And-1-1},
             ...
          }
```

A base station may configure one or a plurality of search space sets for a terminal based on configuration information. According to some embodiments, a base station may configure a search space set 1 and a search space set 2 for a terminal, may configure a search space set 1 so that a terminal monitors a DCI format A scrambled by an X-RNTI in a common search space, and may configure a search space set 2 so that a terminal monitors a DCI format B scrambled by an Y-RNTI in a UE-specific search space.

According to configuration information, one or a plurality of search space sets may be present in a common search space or a UE-specific search space. For example, a search space set#1 and a search space set#2 may be configured as common search spaces. A search space set#3 and a search space set#4 may be configured as UE-specific search spaces.

In a common search space, a terminal may monitor the following combinations of DCI formats and RNTIs. Of course, the present disclosure is not limited to the following example.

DCI format 0_0/1_0 with CRC scrambled by C-RNTI, CS-RNTI, SP-CSI-RNTI, RA-RNTI, TC-RNTI, P-RNTI, SI-RNTI In a UE-specific search space, a terminal may monitor the following combinations of DCI formats and RNTIs. Of course, the present disclosure is not limited to the following example.

DCI format 0_0/1_0 with CRC scrambled by C-RNTI, CS-RNTI, TC-RNTI the DCI format 1_0/1_1 with CRC scrambled by C-RNTI, CS-RNTI, TC-RNTI The specified RNTIs may follow the following definition and use.

Cell RNTI (C-RNTI): UE-specific PDSCH scheduling use

Temporary Cell RNTI (TC-RNTI): UE-specific PDSCH scheduling use

Configured scheduling RNTI (CS-RNTI): semi-statically configured UE-specific PDSCH scheduling use Random access RNTI (RA-RNTI): PDSCH scheduling use in a random access step Paging RNTI (P-RNTI): scheduling use for a PDSCH in which paging is transmitted System information RNTI (SI-RNTI): scheduling use for a PDSCH in which system information is transmitted Interruption RNTI (INT-RNTI): use for providing notification of whether PDSCH is to be punctured Transmit power control for PUSCH RNTI (TPC-PUSCH-RNTI): indication use for a power adjustment command for a PUSCH Transmit power control for PUCCH RNTI (TPC-PUCCH-RNTI): indication use for a power adjustment command for a PUCCH Transmit power control for SRS RNTI (TPC-SRS-RNTI): indication use for a power adjustment command for an SRS The specified DCI formats may follow the definition of Table 9.

TABLE 9

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PUSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, the search space of an AL L in a control region p and a search space set s may be represented as in an equation below.

$$L * \left\{ \left( Y_{p,n_{s,f}^r} + \left\lfloor \frac{m_{s,n_m} * N_{CCE,p}}{L * M_{p,s,max}^{(L)}} \right\rfloor + n_{CI} \right) \mod \lfloor N_{CCE,p}/L \rfloor \right\} + i \quad \text{[Equation 1]}$$

L: an aggregation level
$n_{CI}$: a carrier index
$N_{CCE,p}$: a total number of CCEs within the control region p
$n^\mu_{s,f}$: a slot index
$M^{(L)}_{p,s,max}$: the number of PDCCH candidate groups of the AL L
$m_{s,nCI}=0, \ldots, M^{(L)}_{p,s,max}-1$: PDCCH candidate group indices of the AL L
$i=0, \ldots, L-1$
$Y_{p,n^\mu_{s,f}}=(A_p * Y_{p,n^\mu_{s,f}-1}) \mod D$, $Y_{p,-1}=n_{RNTI}\neq 0$, $A_0=39827$, $A_1=39829$, $A_2=39839$, $D=65537$
$n_{RNTI}$: a UE ID
$Y\_(p,n^\mu_{s,f})$ value may correspond to 0 in the case of a common search space.
$Y\_(p,n^\mu_{s,f})$ value may correspond to a value varying depending on the identity of a terminal (a C-RNTI or an ID configured for a terminal by a base station) and a time index in the case of a UE-specific search space.

Figure 6:
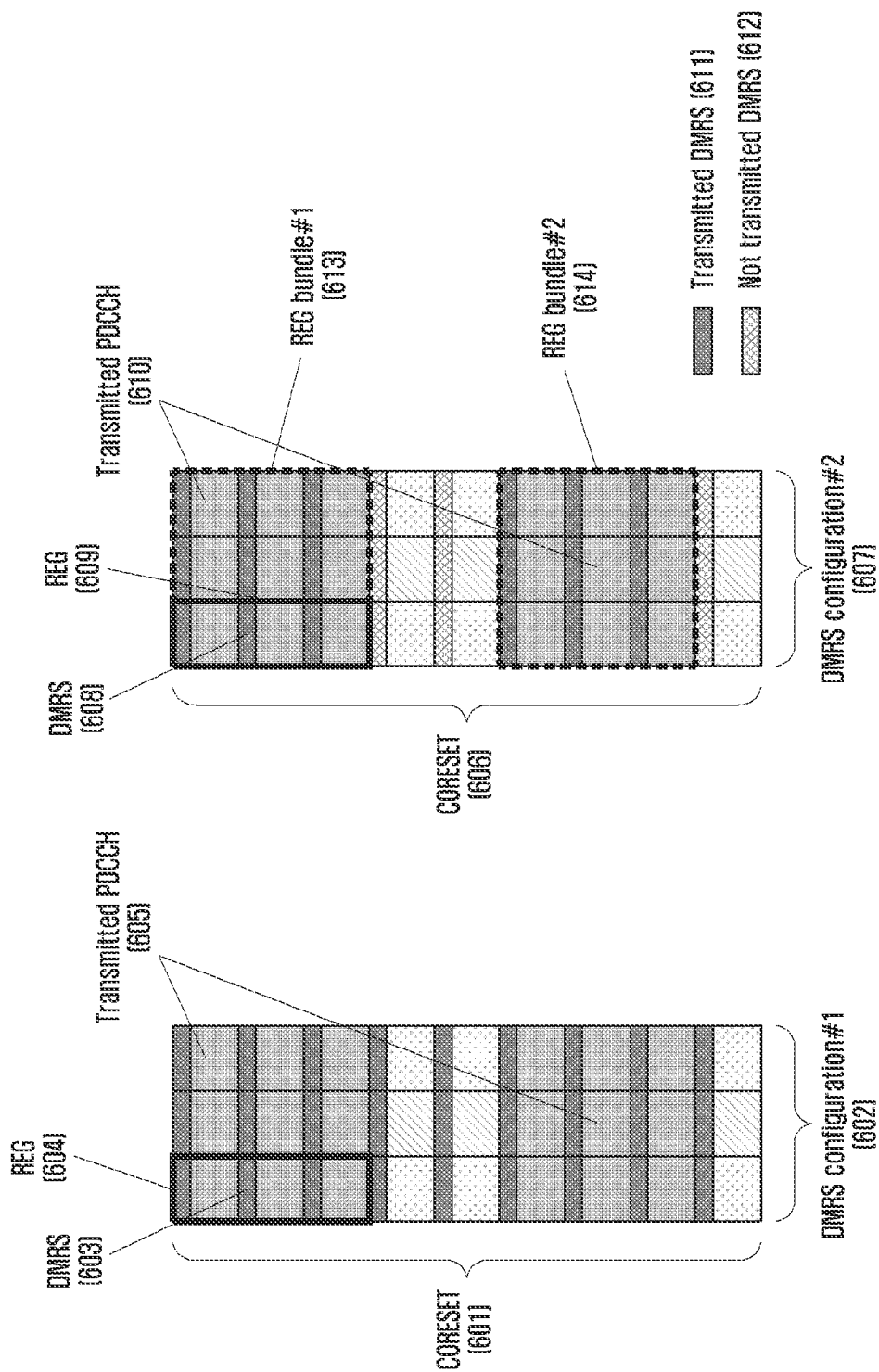
FIG. 6 is a diagram illustrating the structure of a demodulation reference signal (DMRS) of a downlink control channel in a 5G communication system according to some embodiments of the disclosure.

FIG. 6 is a diagram illustrating an example of a DMRS configuration for a downlink control channel in a 5G wireless communication system.

In 5G, a control region may be configured as one of the two types.

[DMRS Configuration#1]

A base station may set an RRC parameter precoderGranularity as allContiguousRBs through higher layer signaling (this is called a DMRS configuration#1). Hereinafter, when it is said that a control region is configured as the DMRS configuration#1, this may mean that a DMRS in which the same precoding is applied to all contiguous RBs (this is called a cluster) within the control region is mapped and transmitted in all REGs within the corresponding control region.

FIG. 6 illustrates that a control region 601 is configured as a DMRS configuration#1 602. Furthermore, this drawing illustrates an example in which the control region 601 is composed of one cluster. If a PDCCH is transmitted (605) in the control region 601, a DMRS 603 may be transmitted from all REGs 604 that constitute the control region 601. In this case, the DMRS 603 may be transmitted even in REGs 604 on which the transmitted PDCCH 604 is not mapped. Furthermore, the same precoding may be applied to all the transmitted DMRSs 603.

A terminal that monitors the control region 601 configured as the DMRS configuration#1 602 may assume that the same precoding is applied to all the DMRSs 603 transmitted in a specific cluster within the control region 601 and all the DMRSs 603 are transmitted, may perform channel estimation on the corresponding control region 601, and may perform blind decoding on the PDCCH 605 based on the estimated channel information.

[DMRS Configuration#2]

A base station may set an RRC parameter precoderGranularity as sameAsREG-bundle through higher layer signaling (this is named a DMRS configuration#2). Hereinafter, when it is said that a control region is configured as the DMRS configuration#2, this may mean that a DMRS to which the same precoding is applied in a pre-configured REG bundle unit is mapped and transmitted in an REG in which a PDCCH is actually transmitted.

An example of FIG. 6 illustrates that a control region 606 is configured as a DMRS configuration#2 607. A DMRS 608 may be transmitted in an REG 609 in which a PDCCH 610 is actually transmitted within the control region 606. Accordingly, a DMRS 611 that is actually transmitted and a DMRS 612 that is not transmitted may be present in the control region 606 depending on whether the PDCCH 610 is transmitted. Furthermore, the same precoding may be applied to the transmitted DMRS 611 within an REG bundle. For example, in FIG. 6, if one transmitted PDCCH 610 is composed of two REG bundles, an REG bundle#1 613 and an REG bundle#2 614, the same precoding may be applied to all transmitted DMRSs 611 within the REG bundle#1 613, and the same precoding may be applied to all transmitted DMRSs 611 within the REG bundle#2 614. The size of the REG bundle may be configured as a part of the configuration of the control region 606 from a base station to a terminal.

A terminal that monitors the control region 606 configured as the DMRS configuration#2 607 may assume that the same precoding is applied in a configured REG bundle unit and a DMRS is transmitted, may perform channel estimation, and may perform blind decoding on the PDCCH 610 based on estimated channel information.

An RS sequence which may be used as a DMRS of a PDCCH may be defined as in Equation 2 below, for example.

$$r_l(m) = \frac{1}{\sqrt{2}}(1 - 2*c(2m)) + j*\frac{1}{\sqrt{2}}(1 - 2*c(2m+1)) \quad \text{[Equation 2]}$$

In Equation 2, $r_l(m)$ is a signal modulated by quadrature phase shift keying (QPSK) in an I-th OFDM symbol, c(m) is a binary pseudo-random sequence, and m is an index. An initial sequence used to generate a pseudo-random sequence c may be defined as in Equation 3 below.

$$c_{init}=(2^{37}(N_{symb}^{slot}n_{s,f}^{\mu}+l+1)(2N_{ID}+1)+2N_{ID}) \bmod 2^{31} \quad \text{[Equation 3]}$$

In Equation 3, $N_{ID}$ may have its pre-defined unique ID (e.g., a cell ID) or a value thereof configured in each terminal through higher layer signaling (e.g., a parameter pdcch-DMRS-ScramblingID through RRC signaling). For example, $N_{ID}$ may be defined as follows.

$N_{ID} \in \{0, 1, \ldots, 65535\}$ is given by the higher-layer parameter pdcch-DMRS-ScramblingID if provided
$N_{ID}=N_{ID}^{cell}$ otherwise.

Hereinafter, an embodiment of the disclosure is specifically described along with accompanying drawings. Hereinafter, an embodiment of the disclosure is described by taking a 5G system as an example, but an embodiment of the disclosure may also be applied to other communication systems having a similar technical background or a channel form. For example, the other communication systems will include LTE or LTE-A mobile communication and a mobile communication technology developed after 5G. Accordingly, an embodiment of the disclosure may also be applied to other communication systems through some modifications without greatly departing from the scope of the disclosure based on a determination of a person having skilled technical knowledge.

Furthermore, in describing the disclosure, a detailed description of a related function or configuration is omitted if it is deemed to make the gist of the disclosure unnecessarily vague. Furthermore, terms to be described hereinafter are terms defined by taking into consideration functions in the disclosure, and may be different depending on a user, an operator's intention or practice, etc. Accordingly, each term should be defined based on contents over the entire specification.

First Embodiment

In a 5G communication system, a network or a base station may adjust various transmission and reception-related parameters through layer 1 (L1) signaling for the purpose of reducing power consumption of a terminal. For example, a network or a base station may control at least one or a combination of one or more of parameters of Table 10 through L1 signaling.

The aforementioned L1 signal transmitted for the purpose of reducing power consumption of a terminal is collectively called a "power saving signal (PoSS)."

A base station may configure, for a terminal, the M(≥1) number of various transmission and reception-related parameters (e.g., one of the parameters of Table 10 or a parameter value composed of a combination corresponding to or one or more of the parameters of Table 10) through higher layer signaling (e.g., an MIB, an SIB, RRC, or a medium access control (MAC) control element (CE)), and may notify the terminal of the configured parameter through an indicator of log 2(M) bit. For example, the base station may configure a total of four parameter combinations (PowerSavingMode#1, PowerSavingMode#2, PowerSavingMode#3, and PowerSavingMode#4) through higher layer signaling as in Table 11 below, and may notify the terminal of the four parameter combinations as an L1 indicator using two bits.

TABLE 11

| Bit | Contents |
|-----|----------|
| 00 | PowerSavingMode#1 (configured by higher layer) |
| 01 | PowerSavingMode#2 (configured by higher layer) |
| 10 | PowerSavingMode#3 (configured by higher layer) |
| 11 | PowerSavingMode#4 (configured by higher layer) |

In this case, PowerSavingMode#X (X=1, 2, 3, 4) may correspond to configuration information for various transmission and reception-related parameters (one or a combination of one or more of the parameters of Table 10). That is, PowerSavingMode#X may be configured as follows.

PowerSavingMode#X={PDCCH-related configuration#X, BWP-related configuration#X, CA-related configuration#X, DRX-related configuration#X, antenna-related configuration#X, time domain resource assignment-related configuration#X, HARQ timing-related configuration#X, CSI-RS configuration#X, the uplink power control configuration#X, other transmission and reception-related configuration information#X}

A base station may transmit a power saving indicator to a terminal as a power saving signal for the purpose of reducing power consumption. The terminal may control (e.g., change an indicated parameter is changed and applied as a transmission and reception parameter) a transmission and reception operation based on the contents of the power saving indicator transmitted as the received power saving signal.

TABLE 10

PDCCH-related configuration parameter (a PDCCH monitoring period, a blind decoding number, an aggregation level (AL), a monitoring occasion, an indicator for PDCCH monitoring, etc.)
BWP-related configuration parameter (a BWP index, a bandwidth size of a BWP, etc.)
CA-related configuration parameter (a CC index, an indicator for CC activation or deactivation, etc.)
DRX-related configuration parameter (a DRX period, a DRX timer-related parameter (onDurationTimer, InactivityTimer, HARQ-RTT-Timer, RetransmissionTimer), etc.)
Antenna-related configuration information (the number of layers, the number of antenna ports, the number of antenna panels, etc.)
Time domain resource assignment-related configuration information (PDCCH-to-PDSCH timing K0, PDCCH-to-PUSCH timing K2)
HARQ timing-related configuration information (PDSCH-to-HARQ timing)
CSI_RS configuration information
Uplink power control information
Other transmission and reception-related configuration information The first embodiment of the disclosure proposes a method of transmitting a power saving signal by using a DMRS of a PDCCH.

As described above with reference to FIG. 6, a DMRS of a PDCCH may be transmitted in a resource region in which the PDCCH is actually mapped and transmitted. That is, the DMRS may be actually transmitted in the resource region (corresponding to a set of clusters in which the PDCCH is transmitted in the case of the DMRS configuration#1, and corresponding to a set of REGs in which the PDCCH is transmitted in the case of the DMRS configuration#2) in which the PDCCH is transmitted within the control region. Likewise, this may mean that if the PDCCH is not transmitted, the DMRS is also not transmitted. Accordingly, a terminal may first determine whether the DMRS has been transmitted before performing blind decoding on the PDCCH, and may differently control the blind decoding operation for the PDCCH based on a result of the determination.

As an example of a method for a terminal to determine whether a PDCCH DMRS has been transmitted, the terminal may compare a correlation value, obtained by performing a correlation operation on a received DMRS, with the size of a threshold value that has been previously defined.

First, the correlation operation is specifically described. An example of an correlation operation for two complex sequences $y_l(m)$ and $r_l(m)$ having a length N, m=0, 1, ..., N−1 may be defined as in Equation 4.

$$\text{Correlation value} = \alpha \times \sum_{m=0}^{N-1} |y_l(m) \times conj(r_l(m))| \quad \text{[Equation 4]}$$

In Equation 4, conj(x) means a conjugate complex of x, and |x| means an absolute value of x. α is a constant for normalization. According to the correlation operation method, a terminal may perform a correlation operation between a previously known RS sequence $r_l(m)$ for a DMRS (refer to Equation 1) and a signal $y_l(m)$ received in a resource region in which the corresponding DMRS may be transmitted, and may obtain a correlation value based on the execution of the correlation operation. The terminal may compare the obtained correlation value with a pre-defined threshold value, and may determine that the corresponding DMRS has been transmitted when the correlation value is greater than the threshold value. A base station may assign, to the terminal, a UE-specific ID (e.g., parameter pdcch-DMRS-ScramblingID through RRC signaling) for generating a pseudo-random sequence for an RS sequence through higher layer signaling. Accordingly, different terminals may use different RS sequences, so that the probability that a DMRS for another terminal is erroneously detected can be reduced.

Figure 7:
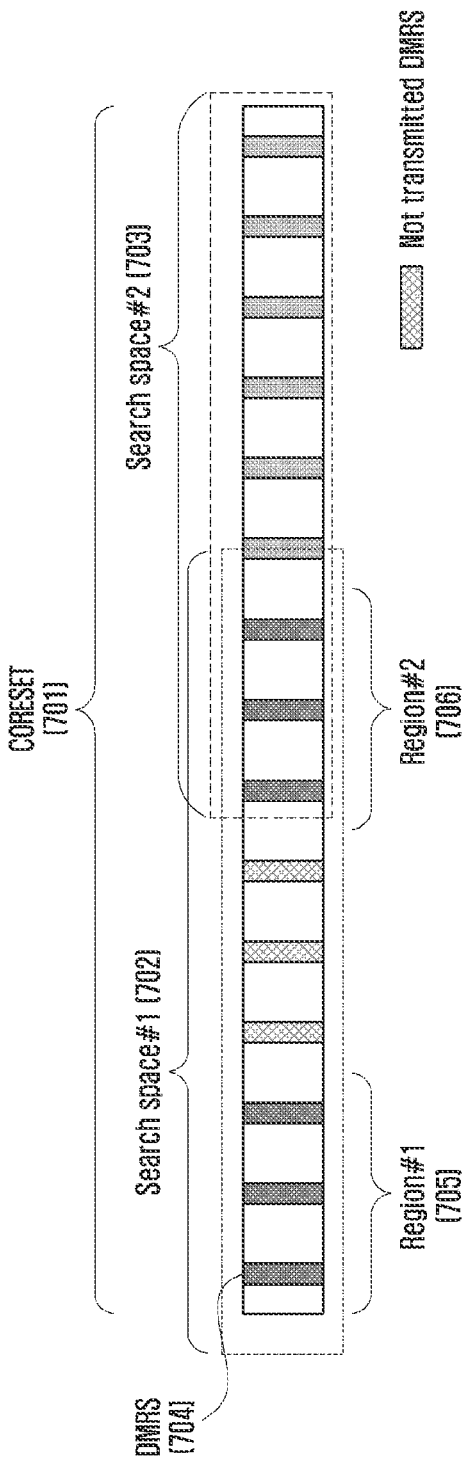
FIG. 7 is a diagram illustrating a method of transmitting a DMRS in a downlink control channel in a 5G communication system according to some embodiments of the disclosure.

A terminal needs to perform the aforementioned correlation operation on DMRS candidate groups of all of possible resource regions in which a DMRS may be transmitted because the terminal cannot be previously aware in which region within a control region the DMRS is transmitted. For convenience sake, an operation of determining whether DMRS candidate groups are transmitted is called "blind detection." In this case, a terminal may perform blind detection on DMRS candidate groups of a region in which a PDCCH of a corresponding terminal may be actually transmitted within the control region, that is, a resource region corresponding to a search space. This is more specifically described with reference to FIG. 7. FIG. 7 illustrates one control region 701, and illustrates a search space#1 702 for a UE#1 and a search space#2 703 for a UE#2 within the control region 701. In this case, the UE#1 may perform the aforementioned blind detection on DMRS 704 candidate groups present in a resource region corresponding to the search space#1 702. The UE#2 may perform the aforementioned blind detection on DMRS (704) candidate groups present in a resource region corresponding to the search space#2 703.

A UE may perform blind detection for a DMRS on a resource region corresponding to a search space within a control region. If the DMRS has been detected in a specific DMRS candidate group, the UE may determine that a PDCCH has been transmitted in a search space present in a resource region including the detected DMRS, and may perform blind decoding for the PDCCH on the search space present in the resource region including the detected DMRS. This is more specifically described with reference to FIG. 7. The UE#1 may perform blind detection for the DMRS 704 present in a resource region corresponding to the search space#1702. If the UE has detected the DMRS 704 in a region#1705 and a region#2706, the UE may perform blind decoding for a PDCCH on search spaces present in the region#1705 and the region#2706.

Figure 8:
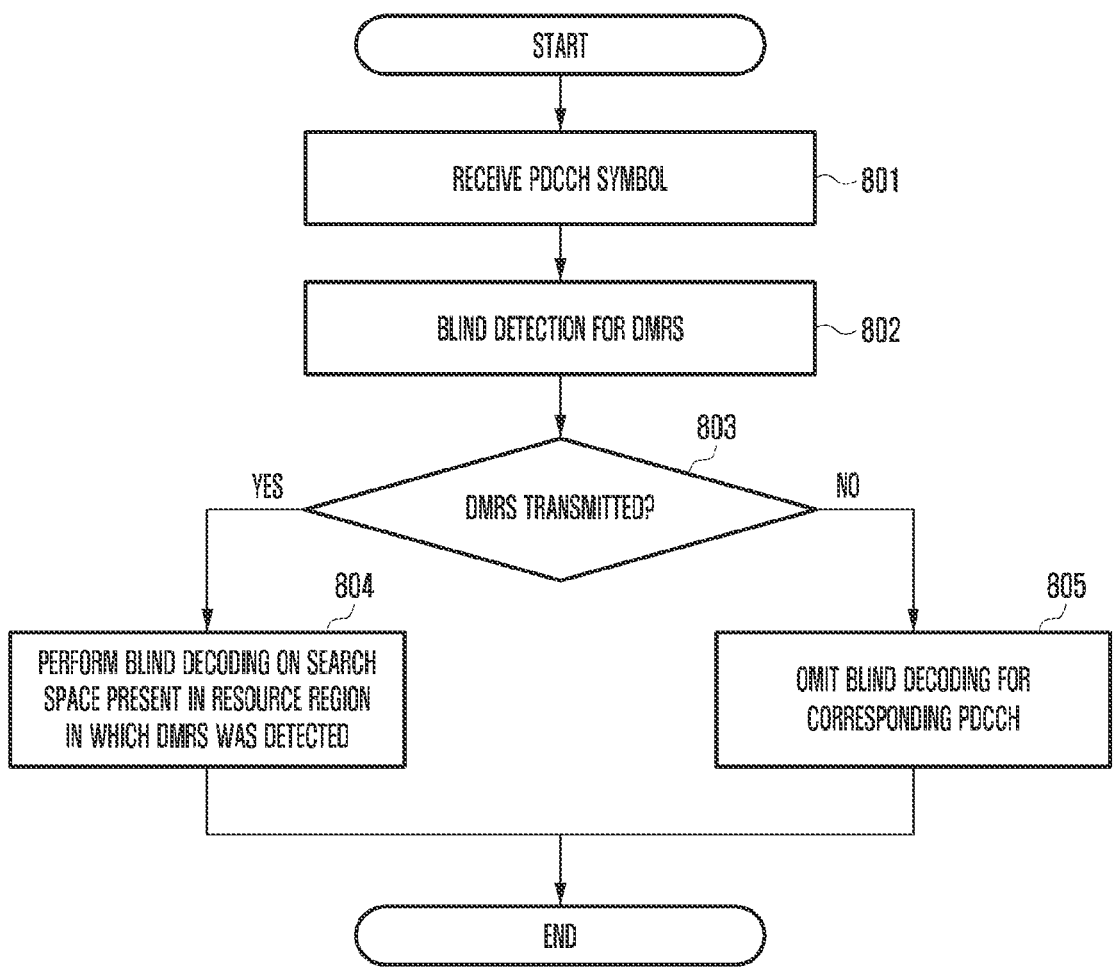
FIG. 8 is a diagram illustrating a terminal operation according to a first embodiment of the disclosure.

FIG. 8 is a diagram illustrating a terminal operation according to the first embodiment of the disclosure.

A terminal may receive an OFDM symbol configured as a control region in which a PDCCH may be transmitted (801). The terminal may perform blind detection for a DMRS in the received OFDM symbol (802). As described above, the terminal may obtain a correlation value through a correlation operation for DMRS candidate groups present in a resource region corresponding to its own search space within the control region, and may perform a series of processes of comparing the correlation value with a pre-defined threshold value. The terminal may determine whether the DMRS has been transmitted based on a result of the blind detection (803). If it has been determined that the DMRS has been transmitted (e.g., if it is determined that a correlation value of a specific DMRS candidate is greater than a threshold value) (803), the terminal may perform PDCCH blind decoding on the search space present in a resource region determined to have the DMRS transmitted therein (804). If it is determined that the DMRS has not been transmitted (e.g., if it is determined that a correlation value of all DMRS candidates is smaller than the threshold value) (803), the terminal may omit blind decoding for the received PDCCH (805).

Through the first embodiment of the disclosure, the terminal may first attempt detection for a DMRS prior to PDCCH blind decoding, and can minimize power consumption according to unnecessary PDCCH blind decoding by differently adjusting a PDCCH blind decoding operation based on whether the DMRS has been transmitted. More specifically, if it is determined that a transmitted DMRS is not present, the terminal can reduce power consumption according to blind decoding because the terminal can omit the entire blind decoding for a PDCCH of a corresponding control region. If the DMRS has been transmitted, the terminal does not perform conventional blind decoding for all search spaces, and performs PDCCH blind decoding on only a search space corresponding to a resource region in which the DMRS has been transmitted. Accordingly, power consumption according to blind decoding can be reduced because blind decoding for some search spaces can be omitted.

The first embodiment of the disclosure has proposed an operation of differently adjusting PDCCH blind decoding based on whether a PDCCH DMRS is present. This may be considered that a power saving signal indicative of a PDCCH-related configuration parameter among the parameters described in Table 10 has been transmitted using the DMRS of the PDCCH. That is, this may be considered that information on one bit that determines whether to monitor the PDCCH is mapped and transmitted based on whether the DMRS of the PDCCH is transmitted.

Hereinafter, there is proposed a method of transmitting a power saving signal of one bit or more indicative of various parameters described in Table 10 by using a PDCCH DMRS through various embodiments.

(1-1) Embodiment

Figure 9:
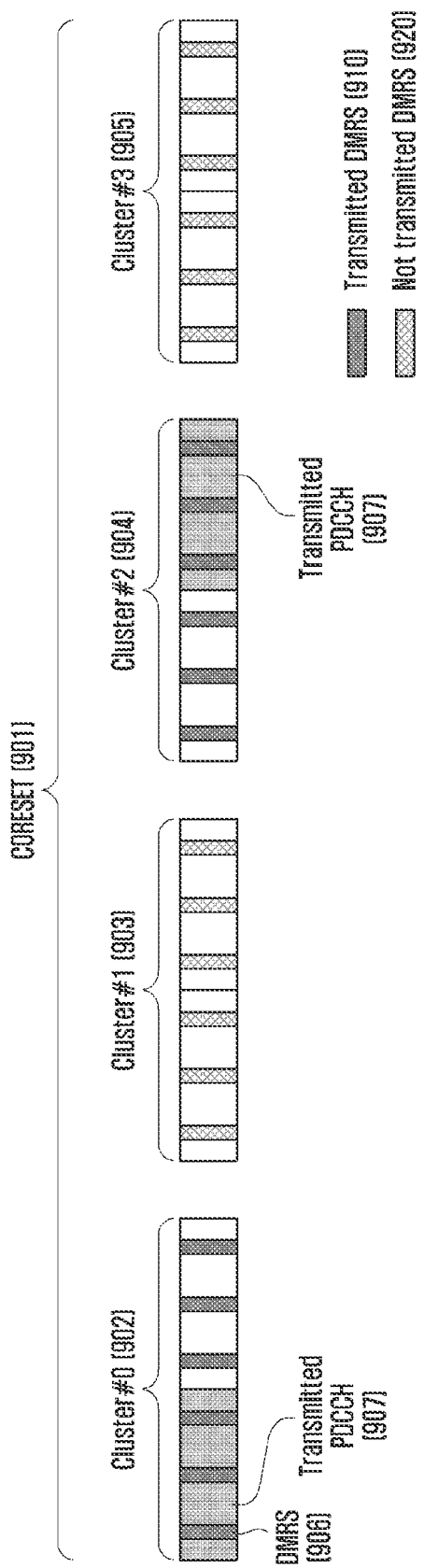
FIG. 9 is a diagram illustrating an example of the transmission of a DMRS-based power saving signal according to a (1-1) embodiment of the disclosure.

FIG. 9 is a diagram illustrating a power saving signal transmission method using a PDCCH DMRS according to a (1-1)-th embodiment of the disclosure. An example of FIG. 9 may correspond to a case where a control region 901 is configured as a DMRS configuration#1 (i.e., an RRC parameter precoderGranularity is set as allContiguousRBs). If the control region 901 is configured as the DMRS configuration#1, the control region may consist of M (1≤M≤4) clusters. The cluster, as described above, may be defined as a set of RBs contiguously configured in a frequency domain. In the example of FIG. 9, the control region 901 is composed of a total of four clusters, a cluster#0 902, a cluster#1 903, a cluster#2 904, and a cluster#3 905. If the control region is configured as the DMRS configuration#1, a DMRS may be transmitted in all REGs present in a cluster in which a PDCCH is transmitted. The example of FIG. 9 illustrates that the PDCCH is transmitted (907) in the resource regions of the cluster#1 902 and the cluster#3 904, and thus illustrates that the DMRS is transmitted in the entire regions of the cluster#1 902 and the cluster#3 904.

A terminal may determine in which cluster a DMRS has been transmitted through a blind detection operation for the DMRS, and may check the contents of a power saving indicator to be indicated by the received DMRS based on information (e.g., a cluster index or a combination of cluster indices) on a cluster in which the DMRS has been transmitted.

For example, the terminal may obtain the contents of a power saving indicator based on the index of a cluster in which a DMRS is transmitted. That is, the indices of clusters and power saving indicator bits may be mapped in a one-to-one manner. For example, if a control region is composed of four clusters#0, #1, #2, and #3, the indices of the clusters and power saving indicator bits may have a mapping relation, such as Table 12 below, for example.

TABLE 12

| Cluster index | Indicator bit | Contents |
|---|---|---|
| 0 | 00 | PowerSavingMode#1 (configured by higher layer) |
| 1 | 01 | PowerSavingMode#2 (configured by higher layer) |
| 2 | 10 | PowerSavingMode#3 (configured by higher layer) |
| 3 | 11 | PowerSavingMode#4 (configured by higher layer) |

For another example, if a DMRS has been transmitted in one or one or more clusters, a terminal may obtain the contents of a power saving indicator based on a combination of one or one or more cluster indices. That is, combinations of the indices of the one or more clusters may be mapped on power saving indicator bits in a one-to-one manner. For example, if a control region is composed of two clusters#0 and #1, cluster indices and power saving indicator bits may have a mapping relation, such as Table 13 below, for example.

TABLE 13

| Cluster index | Indicator bit | Contents |
|---|---|---|
| 0 | 00 | PowerSavingMode#1 (configured by higher layer) |
| 1 | 01 | PowerSavingMode#2 (configured by higher layer) |
| 0, 1 | 10 | PowerSavingMode#3 (configured by higher layer) |

A terminal may determine in which cluster a DMRS has been transmitted through a blind detection operation for the DMRS, and may check the contents of a power saving indicator to be indicated by the received DMRS based on information (e.g., a cluster index or a combination of cluster indices) on a cluster in which the DMRS has been transmitted. After applying a configuration parameter based on the contents of the power saving indicator, the terminal may perform blind decoding for a PDCCH. In this case, the terminal may perform the blind decoding for the PDCCH on a search space present in a resource region in which the DMRS was detected.

A cluster index may be previously defined between a terminal and a base station or a base station may configure a cluster index for a terminal through higher layer signaling (e.g., RRC signaling).

A relation between a cluster index and a power saving indicator may be previously defined between a terminal and a base station or a base station may configure the relation for a terminal through higher layer signaling (e.g., RRC signaling).

(1-2) Embodiment

Figure 10:
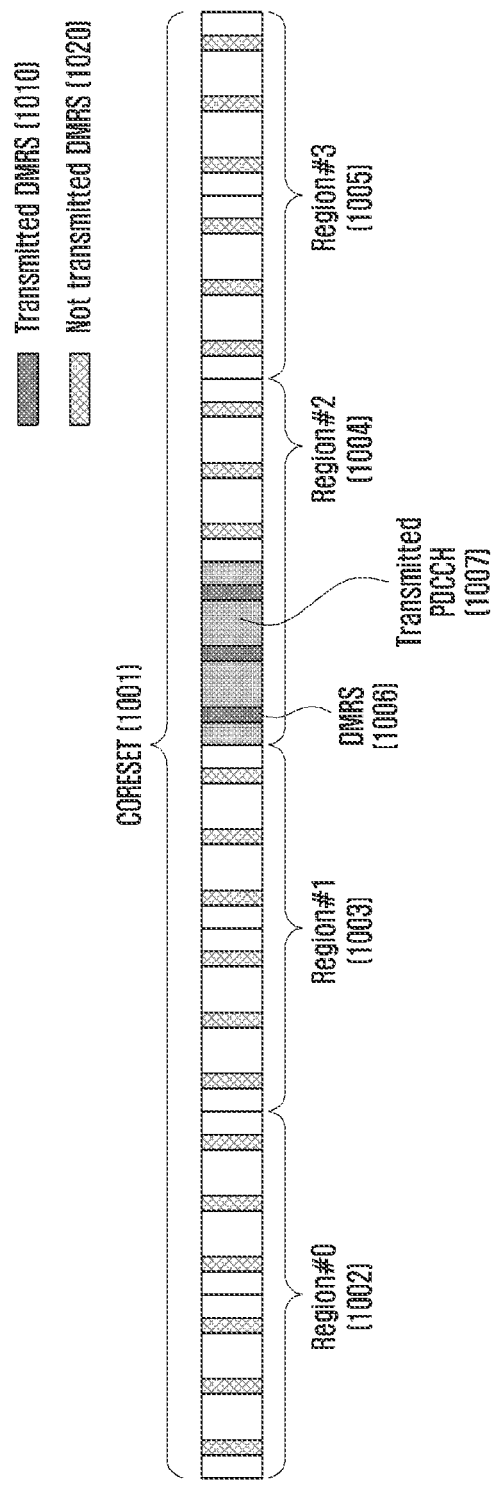
FIG. 10 is a diagram illustrating an example of the transmission of a DMRS-based power saving signal according to a (1-2) embodiment of the disclosure.

FIG. 10 is a diagram illustrating a power saving signal transmission method using a PDCCH DMRS according to a (1-2) embodiment of the disclosure. An example of FIG. 10 may correspond to a case where a control region 1001 is configured as a DMRS configuration#2 (i.e., an RRC parameter precoderGranularity is set as sameAsREG-bundle). If the control region is configured as the DMRS configuration#2, a DMRS may be transmitted only in an REG on which a PDCCH is actually mapped and transmitted. The example of FIG. 10 illustrates that a DMRS is transmitted (1010) only in a resource 1007 on which a PDCCH is actually mapped and transmitted within the control region and the DMRS is not transmitted (1020) in other resources.

In the example of FIG. 10, the entire control region 1001 may be divided into one or multiple sub-control regions (sub-CORESETs (or sub-regions)) in a frequency or time axis. In FIG. 10, the control region 1001 may be divided into a total of four sub-control regions (region#0 1002, region#1 1003, region#2 1004, and region#3 1005). The division of the control region 1001 into the one or multiple sub-control regions may be previously defined or may be implicitly determined based on a system parameter, or a base station may explicitly configure the division for a terminal through higher layer signaling (e.g., RRC signaling). For example, a base station may set, for a terminal, the number of sub-control regions M(≥1) to be divided from the control region 1001 through higher layer signaling. If the entire control region 1001 has been composed of a total of N(≥1) RBs in the frequency domain, each region may consist of floor(N/M) (or ceil(N/M)) RBs. In this case, the floor(x) is a function that outputs the greatest value among integers smaller than x, and the ceil(y) is a function that outputs the smallest value among integers greater than y. For another example, if one control region is configured throughout multiple bandwidth parts, a terminal may consider a part of the control region belonging to each bandwidth part to be a sub-control region. That is, if one control region is configured throughout a K(≥1) bandwidth part, K sub-control regions may be present. A sub-control region present in each bandwidth part may be defined as a part of the control region configured in each bandwidth part.

A terminal may determine in which sub-control region within the entire control region a DMRS has been transmitted through a blind detection operation for the DMRS, and may check the contents of a power saving indicator to be indicated by the received DMRS based on information (e.g., the index of a sub-control region or a combination of sub-control region indices) on a sub-control region in which the DMRS has been transmitted.

For example, a terminal may obtain the contents of a power saving indicator based on the index of a sub-control region in which a DMRS is transmitted. That is, sub-control region indices and power saving indicator bits may be mapped in a one-to-one manner. For example, if a control region is composed of four sub-control regions (region#0, region#1, region#2, and region#3), sub-control region indices and power saving indicator bits may have a mapping relation, such as Table 14 below, for example.

TABLE 14

| sub-region index | Indicator bit | Contents |
| --- | --- | --- |
| 0 | 00 | PowerSavingMode#1 (configured by higher layer) |
| 1 | 01 | PowerSavingMode#2 (configured by higher layer) |
| 2 | 10 | PowerSavingMode#3 (configured by higher layer) |
| 3 | 11 | PowerSavingMode#4 (configured by higher layer) |

For example, in FIG. 10, a partial resource region in which a DMRS is transmitted (1006) is the region#2 1004. Accordingly, the partial resource region may be mapped on the indicator bit "10" in Table 7. It may be interpreted that the indicator bit "10" indicates PowerSavingMode#3.

For another example, if a DMRS has been transmitted in one or more sub-control regions, a terminal may obtain the contents of a power saving indicator based on a combination of the indices of the one or more sub-control regions. That is, combinations of the indices of the one or more sub-control regions may be mapped on power saving indicator bits in a one-to-one manner. For example, if a control region is composed of two sub-control regions (region#0 and region#1), sub-control region indices and power saving indicator bits may have a mapping relation, such as Table 15 below, for example.

TABLE 15

| sub-region index | Indicator bit | Contents |
| --- | --- | --- |
| 0 | 00 | PowerSavingMode#1 (configured by higher layer) |
| 1 | 01 | PowerSavingMode#2 (configured by higher layer) |
| 0, 1 | 10 | PowerSavingMode#3 (configured by higher layer) |

A terminal may determine in which sub-control region a DMRS has been transmitted through a blind detection operation for the DMRS, and may check the contents of a power saving indicator to be indicated by the received DMRS based on information (e.g., a sub-control region index or a combination of sub-control region indices) on a sub-control region in which the DMRS has been transmitted. After applying a configuration parameter based on the contents of the power saving indicator, the terminal may perform blind decoding for a PDCCH. In this case, the terminal may perform the blind decoding for the PDCCH on a search space present in a resource region in which the DMRS was detected.

A sub-control region index may be previously defined between a terminal and a base station, or a base station may configure the sub-control region index for a terminal through higher layer signaling (e.g., RRC signaling).

A relation between a sub-control region index and a power saving indicator may be previously defined between a terminal and a base station or a base station may configure the relation for a terminal through higher layer signaling (e.g., RRC signaling).

(1-3) Embodiment

A terminal may be aware of information on a resource in which a DMRS has been transmitted through a blind detection operation for a PDCCH DMRS, and may obtain a "detection index" from the information. In this case, the "detection index" may be defined as at least one or a combination of one or more of the following indices, for example.

the index of a cluster in which a PDCCH DMRS is detected (corresponding to the (1-1) embodiment)
 the index of a sub-control region in which a PDCCH DMRS is detected (corresponding to the (1-2) embodiment)
 the index of a control region in which a PDCCH DMRS is detected
 the index of a search space set in which a PDCCH DMRS is detected
 the lowest index (or the highest index) among REGs in which a PDCCH DMRS is detected
 the lowest index (or the highest index) among CCEs in which a PDCCH DMRS is detected
 the lowest index (or the highest index) among PDCCH candidates in which a PDCCH DMRS is detected The "detection index" obtained through the DMRS detection may have a specific mapping relation with a power saving indicator. The relation between the "detection index" and the power saving indicator may be previously defined between the terminal and a base station, or the base station may configure the relation for the terminal through higher layer signaling (e.g., RRC signaling). As an example in which the relation is previously defined, if a power saving indicator is M bits, "detection index" is i, and the power saving indicator is j, a relation between the "detection index" and the power saving indicator may be defined as in Equation 5.

$$j = i \bmod 2^M \quad \text{[Equation 5]}$$

In Equation 5, A modulo B may be defined as a function that outputs the remainder obtained by dividing A by B. The power saving indicator j may be converted into binary numbers and changed into an indicator bit. A terminal may obtain a "detection index" based on information on a resource in which a DMRS obtained through blind detection for the DMRS has been transmitted, and may obtain the contents of a power saving indicator from a mapping relation between the "detection index" and the power saving indicator.

An example of the mapping relation between the "detection index" and the power saving indicator based on Equation 5 is illustrated in Table 16 below.

TABLE 16

| Detected index | Indicator bit | Contents |
| --- | --- | --- |
| 0, 4 | 00 | PowerSavingMode#1 (configured by higher layer) |
| 1, 5 | 01 | PowerSavingMode#2 (configured by higher layer) |
| 2, 6 | 10 | PowerSavingMode#3 (configured by higher layer) |
| 3, 7 | 11 | PowerSavingMode#4 (configured by higher layer) |

In the example of Table 9, it is assumed that the number of bits of a power saving indicator is M=2 bits and a set of all of possible "detection indices" is {#0, #1, #2, #3, #4, #5, #6, #7}.

Figure 11:
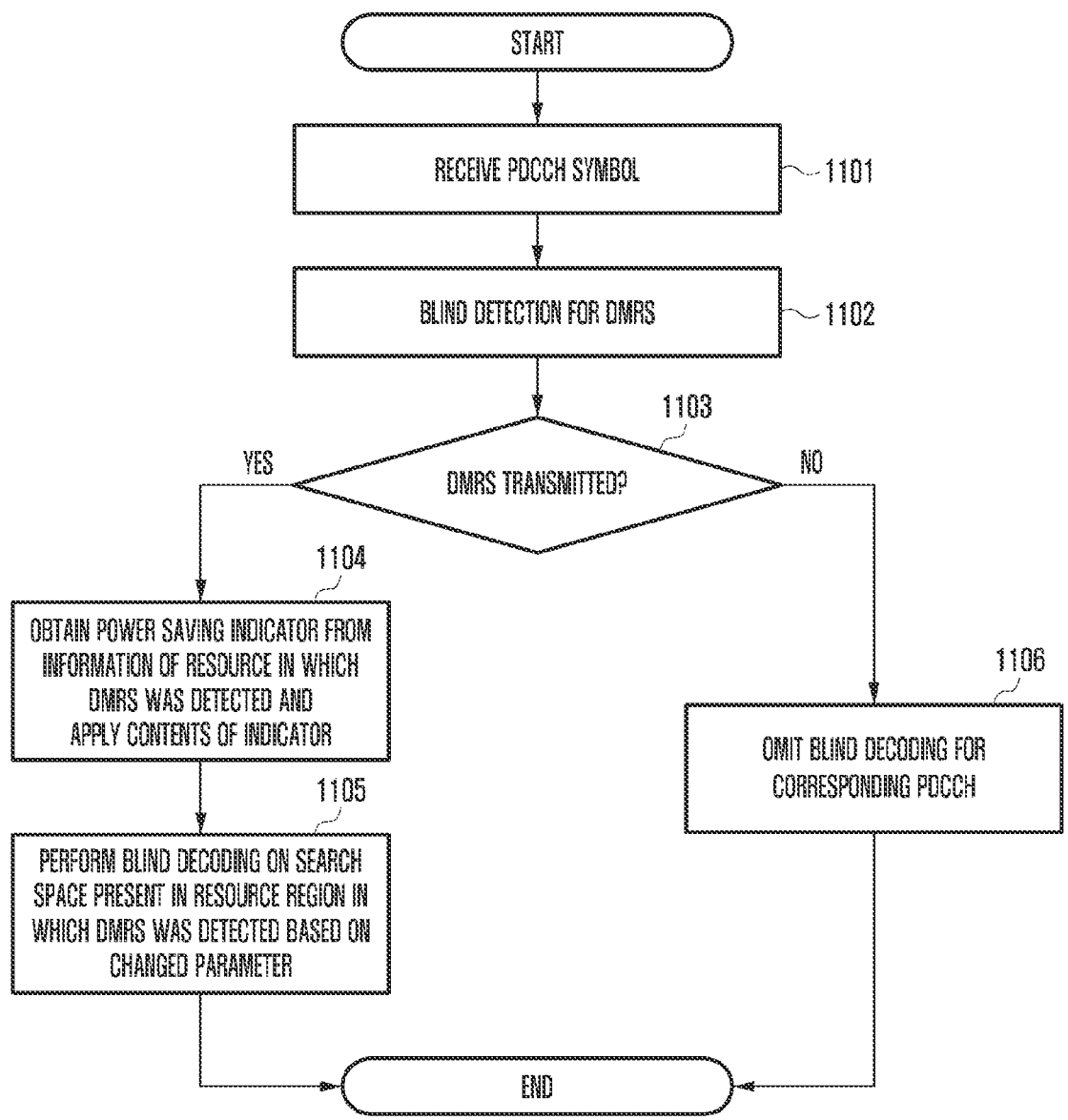
FIG. 11 is a diagram illustrating a terminal operation according to some embodiments of the disclosure.

FIG. 11 is a diagram illustrating a terminal operation according to the (1-1) embodiment, (1-2) embodiment, and (1-3) embodiment of the disclosure.

A terminal may receive an OFDM symbol configured as a control region in which a PDCCH may be transmitted (1101). The terminal may perform blind detection for a DMRS in the received OFDM symbol (1102). As described above, the terminal may obtain a correlation value for DMRS candidate groups present in a resource region corresponding to its own search space within the control region through a correlation operation, and may perform a series of processes of comparing the correlation value with a pre-defined threshold value. The terminal may determine whether the DMRS has been transmitted (1103). If it is determined that the DMRS has been transmitted (e.g., if it is determined that a correlation value of a specific DMRS candidate is greater than the threshold value) (1103), the terminal may obtain a power saving indicator from information on a resource in which the DMRS is detected (e.g., the index of a cluster in which a PDCCH DMRS is detected (corresponding to the (1-1) embodiment), the index of a sub-control region in which a PDCCH DMRS is detected (corresponding to the (1-2) embodiment), the index of a control region in which a PDCCH DMRS is detected, the index of a search space set in which a PDCCH DMRS is detected, the lowest index (or the highest index) among REGs in which a PDCCH DMRS is detected, the lowest index (or the highest index) among CCEs in which a PDCCH DMRS is detected, or the lowest index (or the highest index) among PDCCH candidates in which a PDCCH DMRS is detected) (for detailed contents, refer to the (1-1) embodiment, the (1-2) embodiment, and the (1-3) embodiment). The terminal may change or control (1104, that is, apply the contents of the power saving indicator) a transmission and reception parameter based on the contents of the obtained power saving indicator. The terminal may perform PDCCH blind decoding on a search space present in a resource region in which the DMRS is detected based on the parameter changed based on the power saving indicator (1105). If it is determined that the DMRS is not transmitted (e.g., if it is determined that a correlation value of each of all DMRS candidates is smaller than a threshold value)(1103), the terminal may omit blind decoding for the received PDCCH (1106).

Second Embodiment

A terminal, as described above, may determine whether a PDCCH DMRS has been transmitted by comparing a correlation value with a threshold value. In this case, if the DMRS sequence of a specific terminal A is identical with the DMRS sequence of another terminal B, the terminal A may detect the DMRS of the terminal B transmitted when the PDCCH of the terminal B was transmitted. In this case, if the terminal A obtains power saving indicator information based on the detected DMRS of the terminal B and changes its own transmission and reception operation, a problem may occur.

In order to solve such a problem, if a PDCCH DMRS is to be used as a power saving signal, a base station may differently configure PDCCH DMRS sequences of terminals in a UE-specific manner. That is, the base station may differently assign an ID (e.g., a parameter pdcch-DMRS-ScramblingID through RRC signaling) for generating a pseudo-random sequence for a PDCCH DMRS sequence for each terminal through higher layer signaling. Accordingly, different terminals may use different RS sequences, and the probability that the DMRS of another terminal may be erroneously detected can be reduced.

The second embodiment of the disclosure is more specifically described with reference to a drawing.

Figure 12:
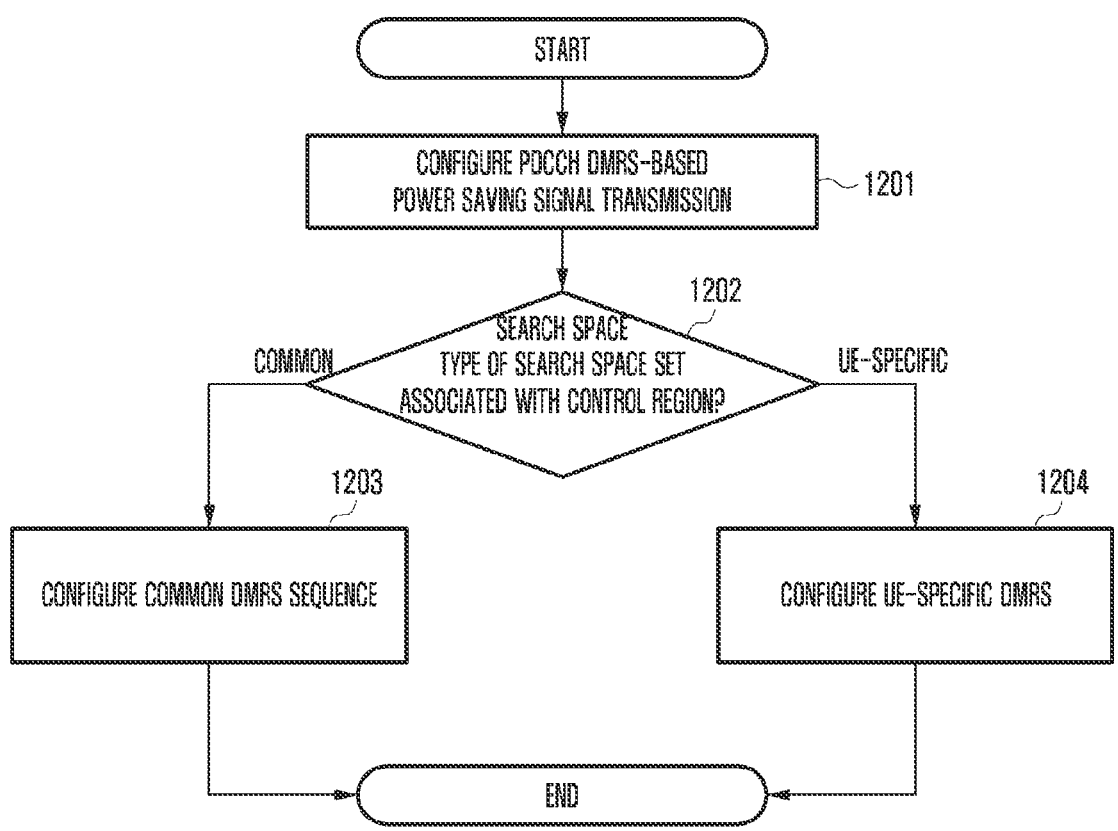
FIG. 12 is a diagram illustrating a base station operation according to some embodiments of the disclosure.

FIG. 12 is a diagram illustrating a base station operation according to the second embodiment of the disclosure.

A base station may configure that a terminal will monitor a power saving signal based on a PDCCH DMRS through higher layer signaling (e.g., RRC or MAC CE) (1201). That is, if the base station has triggered the transmission of a PDCCH DMRS-based power saving signal, the terminal may receive a power saving indicator by performing blind detection for a PDCCH DMRS. The base station attempting to transmit the PDCCH DMRS-based power saving signal may configure, for each terminal, the sequence of a DMRS transmitted in each control region. In this case, the base station may configure a different DMRS sequence depending on the type of search space set associated with the control region. The base station may determine a search space type of a search space set associated with a specific control region with respect to the corresponding control region for which a DMRS will be configured (1202).

If the search space type of at least one of search space sets associated with the specific control region corresponds to a common search space, the base station may set an ID for generating a pseudo-random sequence for the sequence of a DMRS transmitted in the corresponding control region as a value common to multiple terminals or a value common to a group (1203).

If all the search space types of search space sets associated with the specific control region correspond to a UE-specific search space, the base station may configure an ID for generating a pseudo-random sequence for the sequence of a DMRS transmitted in the corresponding control region as a UE-specific value (1204).

The terminal may perform blind detection for the DMRS based on a DMRS sequence configured by the base station, and may receive a power saving indicator therefrom.

Third Embodiment

In performing an embodiment of the disclosure, PDCCH reception frequency of a terminal may be different depending on the size of a threshold value necessary to determine whether a PDCCH DMRS has been transmitted. For example, when the threshold value is relatively small, it may be determined that more DMRS candidates have been transmitted, and thus the PDCCH blind decoding number of the terminal may be increased. In this case, the probability that the terminal will successfully receive a PDCCH may rise, whereas greater power consumption may occur because unnecessary blind decoding is performed. On the contrary to this, when the threshold value is relatively great, it may be determined that smaller DMRS candidates have been transmitted, and thus the PDCCH blind decoding number of the terminal may be decreased. In this case, the probability that the terminal will successfully receive a PDCCH is decreased, whereas a gain may be obtained from the viewpoint of power consumption because unnecessary blind decoding is minimized. Accordingly, it is very important to determine a proper threshold value.

According to the third embodiment of the disclosure, the threshold value for determining whether a PDCCH DMRS has been transmitted may be determined based on various system parameters (e.g., radio link quality, the amount of power of a terminal, the amount of traffic, the type of traffic, or PDCCH configuration information).

As an example of a method of determining a threshold value, a base station and a terminal may differently adjust the threshold value based on a channel state (or received signal quality) between the base station and the terminal. The channel state may include reference signal received power (RSRP), reference signal received quality (RSRQ), channel quality Information (CQI), etc. for example. The terminal may measure the channel state by using various RSs, for example, a measurement reference signal (MRS), and a beam reference signal (BRS) channel state information reference signal (CSI-RS). If the channel state is good, this means that the distortion of a received signal is small compared to a transmitted signal. Accordingly, if the channel state is good, a correlation value obtained through a correlation operation for a control channel detection signal can be more precisely measured. As the correlation value is more precisely measured, a terminal may better determine whether a control channel detection signal is present although the threshold value is relatively great. As a result, from the viewpoint of a terminal operation and power consumption, it may be more efficient to increase the threshold value as the channel state becomes better so that blind decoding can be performed on only a partial search space. On the contrary to this, if the channel state is not good, it may be more efficient to increase a decoding success probability for an NR-PDCCH by relatively reducing the threshold value.

As another example of a method of determining a threshold value, a base station and a terminal may differently adjust the threshold value based on a battery state of the terminal. The battery state of the terminal may include all states related to a battery, such as the amount of remaining battery power, the amount of battery heat generated, and the amount of battery charged. For example, as the amount of remaining battery power of a terminal is reduced, a power-efficient terminal operation in monitoring a PDCCH is more preferred. Accordingly, it is efficient for a terminal to perform blind decoding on a minimum search space as the amount of remaining battery power becomes smaller. To this end, it may be preferred to increase the threshold value. On the contrary to this, it may be more preferred to successfully perform decoding for a PDCCH as the amount of remaining battery power of a terminal is increased. To this end, it may be preferred to set a small threshold value.

As still another example of a method of determining a threshold value, a base station and a terminal may differently adjust the threshold value based on the amount of traffic or the type of traffic. For example, frequency of PDCCH transmission including scheduling may be increased as the amount of traffic increases. Accordingly, to relatively reduce the threshold value may be effective because the probability that a PDCCH will be successfully received can be. In contrast, from the viewpoint of a reduction of power consumption of a terminal, frequency of PDCCH transmission including scheduling may be decreased as the amount of traffic decreases. Accordingly, to relatively increase the threshold value may be effective because the unnecessary number of PDCCH blind decodings can be reduced. For another example, in the case of relatively important traffic (e.g., URLLC traffic), to relatively reduce the threshold value may be effective because successfully receiving a PDCCH is very important. In the case of traffic (e.g., eMBB traffic) having relatively low importance, it may be effective to relatively increase the threshold value in order to reduce power consumption of a terminal.

As still another example of a method of determining a threshold value, a base station and a terminal may differently adjust the threshold value based on PDCCH configuration information. For example, the base station and the terminal may differently determine the threshold value based on a search space type. For example, it may be effective to relatively reduce the threshold value because it is very important to successfully receive a PDCCH with respect to a common search space in which relatively important control information may be transmitted. It may be effective to relatively increase the threshold value for the purpose of reducing power consumption of a terminal with respect to a UE-specific search space in which control information having relatively low importance may be transmitted. For another example, the threshold value may be differently determined based on an aggregation level. In general, if radio signal quality between a base station and a terminal is not good, the base station may transmit, to the terminal, a PDCCH in a search space corresponding to a relatively high aggregation level. If radio signal quality between a base station and a terminal is good, the base station may transmit, to the terminal, a PDCCH in a search space corresponding to a relatively low aggregation level. Accordingly, it may be effective to increase the probability that the PDCCH will be successfully received by relatively reducing the threshold value with respect to a search space corresponding to a relatively high aggregation level. It may be effective to expect a reduction in power consumption of the terminal by relatively increasing the threshold value with respect to a search space corresponding to a relatively low aggregation level.

A base station may set the aforementioned threshold value for a terminal through higher layer signaling (e.g., MIB, SIB, RRC, or MAC CE) or may indicate the aforementioned threshold value for the terminal through L1 signaling (e.g., PDCCH). In this case, the base station may determine the threshold value by considering the aforementioned various system parameters (e.g., radio link quality, the amount of power of the terminal, the amount of traffic, the type of traffic, and PDCCH configuration information), and may notify the terminal of the determined threshold value. A base station may set multiple threshold values for a terminal based on each system parameter. For example, a base station may set threshold values for a terminal as in Table 17.

TABLE 17

| Parameter | Threshold value ($\eta$) |
|---|---|
| Parameter A | $\eta_1$ |
| Parameter B | $\eta_2$ |

A terminal may determine whether a DMRS has been transmitted by applying a different threshold value for each parameter. For example, the parameter A may be equal to {AL=1, AL=2}, and the parameter B may be equal to {AL=4, AL=8}. The terminal may determine whether a DMRS has been transmitted based on the threshold value $\eta_1$ with respect to a search space corresponding to the parameter A, and may determine whether a DMRS has been transmitted based on the threshold value $\eta_2$ with respect to a search space corresponding to the parameter B. This describes one example, and multiple threshold values may be set based on the radio link quality, the amount of power of a terminal, the amount of traffic, the type of traffic, or the PDCCH configuration information.

Alternatively, a previously agreed value may be used as the size of a threshold value based on a system parameter.

Figure 13:
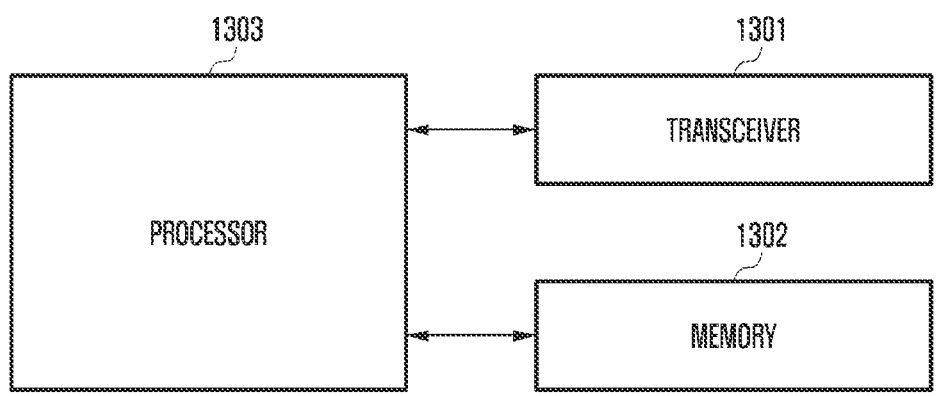
FIG. 13 is a block diagram illustrating an internal structure of a terminal according to some embodiments of the disclosure.
Figure 14:
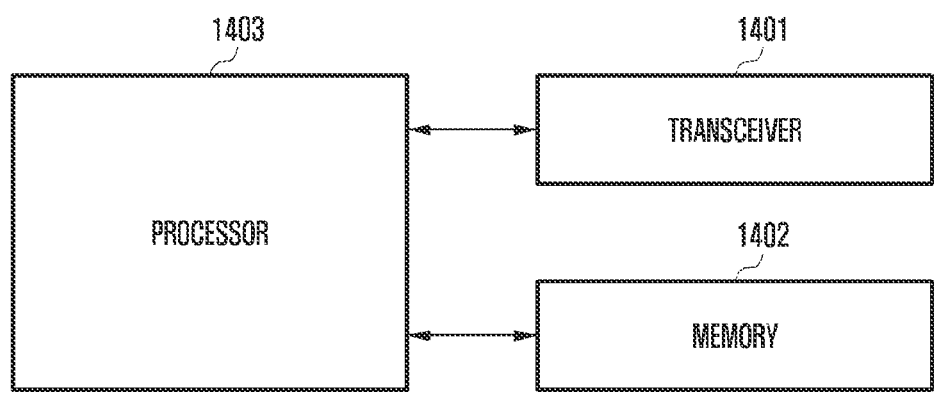
FIG. 14 is a block diagram illustrating an internal structure of a base station according to some embodiments of the disclosure.

The transceivers, memories, and processors of a terminal and a base station are illustrated in FIGS. 13 and 14, respectively, in order to perform the embodiments of the disclosure. In order to perform transmission and reception methods of the base station and the terminal for applying the PDCCH DMRS-based power saving signal transmission method corresponding to the embodiment, the transceiver, memory, and processor of each of the base station and the terminal need to operate according to each embodiment.

FIG. 13 is a block diagram illustrating a structure of the terminal according to an embodiment. Referring to FIG. 13, the terminal may include a transceiver 1301, a memory 1302, and a processor 1303. In this case, components of the terminal are not limited to the aforementioned example. For example, the terminal may include more components than the aforementioned components or may include less components than the aforementioned components. Furthermore, the transceiver 1301, the memory 1302, and the processor 1303 may be implemented in a single chip form.

According to an embodiment, the transceiver 1301 may transmit and receive signals to and from a base station. The signal may include control information and data. To this end, the transceiver 1301 may consist of an RF transmitter for up-converting and amplifying the frequency of a transmitted signal, an RF receiver for low-noise-amplifying a received signal and down-converting the frequency of the received signal, etc. Furthermore, the transceiver 1301 may receive a signal through a radio channel, may output the signal to the processor 1303, and may transmit a signal, output by the processor 1303, through a radio channel.

According to an embodiment, the memory 1302 may store a program and data necessary for an operation of the terminal. Furthermore, the memory 1302 may store control information or data included in signals transmitted and received by the terminal. The memory 1302 may consist of a storage medium, such as a ROM, a RAM, a hard disk, a CD-ROM and a DVD, or a combination of the storage media. Furthermore, the memory 1302 may consist of a plurality of memories. According to an embodiment, the memory 1302 may store a program for a reception operation for a DFT-S-OFDM PDCCH, an inverse DFT precoding operation, blind decoding, etc. of the terminal.

According to an embodiment, the processor 1303 or a controller may control a series of processes which may be operated by the terminal according to the embodiments of the disclosure. For example, the processor 1303 may differently control a PDCCH DMRS detection operation, a PDCCH blind decoding operation, etc. according to embodiments of the disclosure. Furthermore, the processor 1303 may include a plurality of processors, and may differently control a PDCCH DMRS detection operation, a PDCCH blind decoding operation, etc. according to embodiments of the disclosure by executing a program stored in the memory 1302.

FIG. 14 is a block diagram illustrating a structure of the base station according to an embodiment. Referring to FIG. 14, the base station may include a transceiver 1401, a memory 1402, and a processor 1403. In this case, components of the base station are not limited to the aforementioned example. For example, the terminal may include more components than the aforementioned components or may include less components than the aforementioned components. Furthermore, the transceiver 1401, the memory 1402, and the processor 1403 may be implemented in a single chip form.

According to an embodiment, the transceiver 1401 may transmit and receive signals to and from a terminal. The signal may include control information and data. To this end, the transceiver 1401 may consist of an RF transmitter for up-converting and amplifying the frequency of a transmitted signal, an RF receiver for low-noise-amplifying a received signal and down-converting the frequency of the received signal, etc. Furthermore, the transceiver 1401 may receive a signal through a radio channel, may output the signal to the processor 1403, and may transmit a signal, output by the processor 1403, through a radio channel.

According to an embodiment, the memory 1402 may store a program and data necessary for an operation of the terminal. Furthermore, the memory 1402 may store control information or data included in signals transmitted and received by the terminal. The memory 1402 may consist of a storage medium, such as a ROM, a RAM, a hard disk, a CD-ROM and a DVD, or a combination of the storage media. Furthermore, the memory 1402 may consist of a plurality of memories. According to an embodiment, the memory 1402 may store a program for a DFT-S-OFDM-based PDCCH transmission method, etc. of the base station.

According to an embodiment, the processor 1403 may control a series of processes so that the base station operates according to the embodiments of the disclosure. For example, the processor 1403 may differently control a power saving signal transmission method using a PDCCH DMRS, a related parameter configuration, etc. according to an embodiment of the disclosure. Furthermore, the processor 1403 may include a plurality of processors, and may differently control a power saving signal transmission method of the base station using PDCCH DMRS, a related parameter configuration, etc. according to the embodiments of the disclosure by executing a program stored in the memory 1402.

In the aforementioned detailed embodiments of the disclosure, the elements included in the disclosure may be expressed in the singular or plural form depending on the proposed detailed embodiment. However, the singular or plural expression has been selected suitably for a situation proposed for convenience of description, and the disclosure is not limited to the singular or plural elements. Although an element has been expressed in the plural form, it may be configured in the singular form. Although an element has been expressed in the singular form, it may be configured in the plural form.

The embodiments of the disclosure disclosed in the specification and drawings have suggested given examples in order to easily describe the technical contents of the disclosure and to help understanding of the disclosure, and are not intended to limit the scope of the disclosure. That is, it is evident to those skilled in the art to which the disclosure pertains that other modified examples based on the disclosure may be practiced. Furthermore, the embodiments may be combined and operated, if necessary. For example, some or all of one embodiment and another embodiment of the disclosure may be combined and operated by a base station and a terminal. Furthermore, embodiments of the disclosure may also be applied to other communication systems.

The invention claimed is:

1. A method performed by a terminal in a communication system, the method comprising:
   receiving, via higher layer signaling, a first configuration of a plurality of power saving modes, a second configuration of a control resource set (CORESET) including a plurality of regions, and a third configuration of a plurality of physical downlink control channel (PDCCH) demodulation reference signal (DMRS) candidates associated with the plurality of regions, wherein the plurality of power saving modes is respectively mapped to the plurality of regions;
   identifying whether a PDCCH DMRS is detected on a PDCCH DMRS candidate among the plurality of PDCCH DMRS candidates; and
   in case that the PDCCH DMRS is detected on the PDCCH DMRS candidate:
      identifying a region associated with the PDCCH DMRS candidate among the plurality of regions;
      identifying a power saving mode mapped to the identified region among the plurality of power saving modes; and
      obtaining downlink control information by decoding a PDCCH on the identified region based on the identified power saving mode.

2. The method of claim 1, wherein the regions are clusters respectively including a plurality of contiguous resource blocks (RBs) or sub-regions respectively including at least one resource element group (REG) bundle.

3. The method of claim 2, wherein the region is identified based on at least one of an index of a cluster in which the PDCCH DMRS is received, an index of a sub-region in which the PDCCH DMRS is received, an index of the CORESET, an index of a search space set in which the PDCCH DMRS is received, an index of a lowest REG among REGs in which the PDCCH DMRS is received, an index of a lowest control channel element (CCE) among CCEs in which the PDCCH DMRS is received, or an index of a lowest PDCCH candidate among PDCCH candidates in which the PDCCH DMRS is received.

4. The method of claim 1, wherein the plurality of power saving modes respectively associated with configuration indexes for at least one power saving-related parameter includes at least one of PDCCH configuration information, bandwidth part (BWP) configuration information, carrier aggregation (CA) configuration information, discontinuous reception (DRX) configuration information, antenna configuration information, resource assignment configuration information, hybrid automatic repeat request (HARQ) configuration information, channel state information reference signal (CSI-RS) configuration information, or uplink power configuration information.

5. A method performed by a base station in a communication system, the method comprising:
   transmitting, via higher layer signaling, a first configuration of a plurality of power saving modes, a second configuration of a control resource set (CORESET) including a plurality of regions, and a third configuration of a plurality of physical downlink control channel (PDCCH) demodulation reference signal (DMRS) candidates associated with the plurality of regions, wherein the plurality of power saving modes is respectively mapped to the plurality of regions;
   in case of determining to transmit a PDCCH including downlink control information:
      identifying a power saving mode among the plurality of power saving modes;
      identifying a region mapped to the identified power saving mode among the plurality of regions;
      identifying a PDCCH DMRS candidate associated with the identified region among the plurality of PDCCH DMRS candidates;
      transmitting a PDCCH DMRS on the PDCCH DMRS candidate; and
      transmitting the PDCCH on the identified region based on the identified power saving mode.

6. The method of claim 5, wherein the regions are clusters respectively including a plurality of contiguous resource blocks (RBs) or sub-regions respectively including at least one resource element group (REG) bundle, and
   wherein the region is associated with at least one of an index of a cluster in which the PDCCH DMRS is transmitted, an index of a sub-region in which the PDCCH DMRS is transmitted, an index of the CORESET, an index of a search space set in which the PDCCH DMRS is transmitted, an index of a lowest REG among REGs in which the PDCCH DMRS is transmitted, an index of a lowest control channel element (CCE) among CCEs in which the PDCCH DMRS is transmitted, or an index of a lowest PDCCH candidate among PDCCH candidates in which the PDCCH DMRS is transmitted.

7. The method of claim 5, wherein the plurality of power saving modes respectively associated with configuration indexes for at least one power saving-related parameter including at least one of PDCCH configuration information, bandwidth part (BWP) configuration information, carrier aggregation (CA) configuration information, discontinuous reception (DRX) configuration information, antenna configuration information, resource assignment configuration information, hybrid automatic repeat request (HARQ) configuration information, channel state information reference signal (CSI-RS) configuration information, and uplink power configuration information.

8. A terminal in a communication system, the terminal comprising:
- a transceiver; and
- a processor coupled with the transceiver and configured to:
  - receive, via higher layer signaling, a first configuration of a plurality of power saving modes, a second configuration of a control resource set (CORESET) including a plurality of regions, and a third configuration of a plurality of physical downlink control channel (PDCCH) demodulation reference signal (DMRS) candidates associated with the plurality of regions, wherein the plurality of power saving modes is respectively mapped to the plurality of regions;
  - identify whether a PDCCH DMRS is detected on a PDCCH DMRS candidate among the plurality of PDCCH DMRS candidates;
  - in case that the PDCCH DMRS is detected on the PDCCH DMRS candidate:
    - identify a region associated with the PDCCH DMRS candidate among the plurality of regions;
    - identify a power saving mode mapped to the identified region among the plurality of power saving modes; and
    - obtain downlink control information by decoding a PDCCH on the identified region based on the identified power saving mode.

9. The terminal of claim 8, wherein the regions are clusters respectively including a plurality of contiguous resource blocks (RBs) or sub-regions respectively including at least one resource element group (REG) bundle.

10. The terminal of claim 9, wherein the region is identified based on at least one of an index of a cluster in which the PDCCH DMRS is received, an index of a sub-region in which the PDCCH DMRS is received, an index of the CORESET, an index of a search space set in which the PDCCH DMRS is received, an index of a lowest REG among REGs in which the PDCCH DMRS is received, an index of a lowest control channel element (CCE) among CCEs in which the PDCCH DMRS is received, or an index of a lowest PDCCH candidate among PDCCH candidates in which the PDCCH DMRS is received.

11. The terminal of claim 8, wherein the plurality of power saving modes respectively associated with configuration indexes for at least one power saving-related parameter including at least one of PDCCH configuration information, bandwidth part (BWP) configuration information, carrier aggregation (CA) configuration information, discontinuous reception (DRX) configuration information, antenna configuration information, resource assignment configuration information, hybrid automatic repeat request (HARQ) configuration information, channel state information reference signal (CSI-RS) configuration information, or uplink power configuration information.

12. A base station in a communication system, the base station comprising:
- a transceiver; and
- a processor coupled with the transceiver and configured to:
  - transmit, via higher layer signaling, a first configuration of a plurality of power saving modes, a second configuration of a control resource set (CORESET) including a plurality of regions, and a third configuration of a plurality of physical downlink control channel (PDCCH) demodulation reference signal (DMRS) candidates associated with the plurality of regions, wherein the plurality of power saving modes is respectively mapped to the plurality of regions;
  - in case of determining to transmit a PDCCH including downlink control information:
    - identify a power saving mode among the plurality of power saving modes;
    - identify a region mapped to a power saving mode among the plurality of regions;
    - identify a PDCCH DMRS candidate associated with the identified region among the plurality of PDCCH DMRS candidates;
    - transmit a PDCCH DMRS on the PDCCH DMRS candidate; and
    - transmit the PDCCH on the identified region based on the identified power saving mode.

13. The base station of claim 12, wherein the regions are clusters respectively including a plurality of contiguous resource blocks (RBs) or sub-regions respectively including at least one resource element group (REG) bundle.

14. The base station of claim 13, wherein the region is associated with at least one of an index of a cluster in which the PDCCH DMRS is transmitted, an index of a sub-region in which the PDCCH DMRS is transmitted, an index of the CORESET, an index of a search space set in which the PDCCH DMRS is transmitted, an index of a lowest REG among REGs in which the PDCCH DMRS is transmitted, an index of a lowest control channel element (CCE) among CCEs in which the PDCCH DMRS is transmitted, or an index of a lowest PDCCH candidate among PDCCH candidates in which the PDCCH DMRS is transmitted.

15. The base station of claim 12, wherein the plurality of power saving modes respectively associated with configuration indexes for at least one power saving-related parameter including at least one of PDCCH configuration information, bandwidth part (BWP) configuration information, carrier aggregation (CA) configuration information, discontinuous reception (DRX) configuration information, antenna configuration information, resource assignment configuration information, hybrid automatic repeat request (HARQ) configuration information, channel state information reference signal (CSI-RS) configuration information, and uplink power configuration information.

* * * * *